United States Patent
Manba

(10) Patent No.: US 9,575,604 B2
(45) Date of Patent: Feb. 21, 2017

(54) OPERATION INPUT DEVICE, OPERATION INPUT METHOD, AND PROGRAM

(71) Applicant: Sharp Kabushiki Kaisha, Osaka-shi, Osaka (JP)

(72) Inventor: Osamu Manba, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 136 days.

(21) Appl. No.: 14/390,795

(22) PCT Filed: Apr. 4, 2013

(86) PCT No.: PCT/JP2013/060324
§ 371 (c)(1),
(2) Date: Oct. 6, 2014

(87) PCT Pub. No.: WO2013/157400
PCT Pub. Date: Oct. 24, 2013

(65) Prior Publication Data
US 2015/0054780 A1    Feb. 26, 2015

(30) Foreign Application Priority Data

Apr. 20, 2012  (JP) ................................ 2012-096643

(51) Int. Cl.
G06F 3/044 (2006.01)
G06F 3/041 (2006.01)
G06F 1/16 (2006.01)

(52) U.S. Cl.
CPC ............... *G06F 3/044* (2013.01); *G06F 1/169* (2013.01); *G06F 3/0418* (2013.01); *G06F 2203/04108* (2013.01)

(58) Field of Classification Search
None
See application file for complete search history.

(56) References Cited

U.S. PATENT DOCUMENTS

2003/0132922 A1    7/2003  Philipp
2004/0155871 A1*   8/2004  Perski ..................... G06F 3/041
                                                          345/174

(Continued)

FOREIGN PATENT DOCUMENTS

JP    2010-055510 A    3/2010
JP    2010-204812 A    9/2010

(Continued)

OTHER PUBLICATIONS

Official Communication issued in International Patent Application No. PCT/JP2013/060324, mailed on Jul. 2, 2013.

*Primary Examiner* — Antonio Xavier
(74) *Attorney, Agent, or Firm* — Keating & Bennett, LLP

(57) ABSTRACT

A touch pad outputs a detection signal indicating a coordinate corresponding to a contact state where a finger is in contact with the coordinate detecting unit, and a detection signal indicating a coordinate corresponding to a proximity state where the finger is in proximity to, without contact with, the coordinate detecting unit. An operation input device detects, based on the detection signals, a contact region in which the finger is in contact with the coordinate detecting unit, and a proximity region in which the finger is in proximity to, without contact with, the coordinate detecting unit. Then, the operation input device determines a pointed coordinate based on the contact region detected and the proximity region detected.

7 Claims, 19 Drawing Sheets

(56) References Cited

U.S. PATENT DOCUMENTS

| | | | |
|---|---|---|---|
| 2007/0097096 A1* | 5/2007 | Rosenberg | G06F 1/1626 345/173 |
| 2008/0012835 A1* | 1/2008 | Rimon | G06F 3/038 345/173 |
| 2010/0053109 A1 | 3/2010 | Narita | |
| 2010/0149134 A1* | 6/2010 | Westerman | G06F 3/0235 345/179 |
| 2011/0050629 A1* | 3/2011 | Homma | G06F 3/0414 345/174 |
| 2011/0157078 A1* | 6/2011 | Miyazawa | G06F 3/044 345/174 |
| 2011/0267296 A1* | 11/2011 | Noguchi | G06F 3/0412 345/173 |
| 2012/0086647 A1* | 4/2012 | Birkler | G06F 1/3203 345/173 |
| 2013/0076688 A1* | 3/2013 | Tokutake | G06F 3/044 345/174 |

FOREIGN PATENT DOCUMENTS

| | | |
|---|---|---|
| JP | 2012-146026 A | 8/2012 |
| WO | 2006/133018 A2 | 12/2006 |

* cited by examiner

OPERATION INPUT DEVICE, OPERATION INPUT METHOD, AND PROGRAM

TECHNICAL FIELD

The present invention relates to an operation input device, an operation input method, and a program.

Priority is claimed on Japanese Patent Application No. 2012-096643, filed Apr. 20, 2012, the content of which is incorporated herein by reference.

BACKGROUND ART

Recently, touch pads have been widely adopted as operating devices in mobile devices, such as smartphones and tablets. A touch pad is a pointing device capable of pointing a coordinate by a user performing an operation by making a finger as a pointer in contact with the pad.

However, depending on a state of the finger when the user performs an operation on the touch pad, there are some cases where the pointed coordinate actually detected by the touch pad does not correspond to an operation intended by the user.

As a specific example, in a case where an operation is performed by moving the thumb from the wrist side to the fingertip side so as to protrude the thumb, the tip of the thumb is in contact with the touch pad when the operation is initiated. As the thumb is moved to the fingertip side from this state, the tip of the thumb is gradually warped upward and thus is detached from the touch pad, and the belly of the thumb becomes gradually in contact with the touch pad. Then, as the thumb is moved further to the fingertip side, the tip of the thumb is more warped, and thus the portion of the belly of the thumb in contact with the touch pad approaches toward the base of the thumb.

While moving the thumb in this way, the user has an image such that a fingertip corresponds to the pointed coordinate. However, at the time of this operation, the actual contact portion of the thumb with the touch pad moves from the fingertip of the thumb to the base side of the belly thereof, and the pointed coordinate detected by the touch pad also moves correspondingly. Thus, for example, when an operation is performed with the thumb, deviation is likely to occur between the operation intended by the user and the pointed coordinate actually detected by the touch pad.

For this reason, an input device such as the following one is known. In other words, the input device calculates a contact width D of a contact region in a vertical direction based on contact information concerning the touch pad, calculates a center coordinate y of the contact region, and further calculates the amount of correction D/N using the contact width D and a predetermined correction parameter N. Then, while the contact region is moving, the input device calculates the amount of movement of the contact point, using the corrected coordinate Y=y+D/N. While the contact region is stopped, the input device calculates the amount of movement, using the center coordinate of the contact region (see, for example, Patent Document 1).

CITATION LIST

Patent Document

[Patent Document 1] Japanese Unexamined Patent Application, First Publication No. 2010-204812

DISCLOSURE OF THE INVENTION

Problems to be Solved by the Invention

Here, the sizes and shapes of fingers differ for each user. Further, manners of pushing and moving a finger when manipulating a touch pad also differ for each user. According to this, not only a warping state of the finger when manipulating the touch pad, and a position of the belly of the finger in contact with the touch pad, but also a contact state of the finger on the touch pad, differ for each user.

However, the input device described in Patent Document 1 calculates the amount of movement of the contact point of the thumb with the touch pad by calculation using the corrected parameter based on a predetermined value. This means that a pointed coordinate on the touch pad is obtained by estimation. In such a configuration that the pointed coordinate is obtained by estimation, there are some cases where in accordance with the difference for each user in contact state of the finger with respect to the touch pad, and it is difficult to appropriately point a coordinate as intended by the user.

Means for Solving the Problems

An operation input device according to one aspect of the present invention includes: a coordinate detecting unit configured to output a detection signal indicating a coordinate corresponding to a contact state where a finger is in contact with the coordinate detecting unit, and a detection signal indicating a coordinate corresponding to a proximity state where the finger is in proximity to, without contact with, the coordinate detecting unit; a region detecting unit configured to, based on the detection signals, detect a contact region in which the finger is in contact with the coordinate detecting unit, and a proximity region in which the finger is in proximity to, without contact with, the coordinate detecting unit; and a pointed coordinate determining unit configured to determine a pointed coordinate pointed by the finger on the coordinate detecting unit, based on the contact region detected and the proximity region detected.

Additionally, the operation input device may further include a determining unit configured to determine, based on an area of the contact region detected, whether or not to use the proximity region to determine the pointed coordinate. The pointed coordinate determining unit is configured to, in a case that it is determined to use the proximity region, determine the pointed coordinate based on the contact region detected and the proximity region detected. The pointed coordinate determining unit is configured to, in a case that it is determined not to use the proximity region, determine the pointed coordinate based only on the contact region detected.

Further, the operation input device may further include a sensitivity setting unit configured to set sensitivity of the coordinate detecting unit so that the coordinate detecting unit outputs detection signals corresponding to the contact state and the proximity state in the case that it is determined to use the proximity region, and outputs a detection signal corresponding only to the contact state in the case that it is determined not to use the proximity region.

Moreover, in the operation input device, the pointed coordinate determining unit may be configured to, in the case that it is determined to use the proximity region, determine to be the pointed coordinate, a coordinate corresponding to a fingertip in a combined detected region including the contact region detected and the proximity region detected.

Additionally, in the operation input device, the pointed coordinate determining unit may be configured to, in the case that it is determined not to use the proximity region, determine a center coordinate of the contact region detected to be the pointed coordinate.

Further, in the operation input device, the determining unit may be configured to set a threshold value to be compared with the area of the contact region for determination of whether or not to use the proximity region, based on an area of a thumb in contact with the coordinate detecting unit, and an area of any one, but the thumb, of fingers which is in contact with the coordinate detecting unit.

Moreover, the operation input device may further include a proximity region detecting unit configured to detect the proximity region. The region detecting unit is configured to detect only the contact region based on the detection signal output from the coordinate detecting unit. The pointed coordinate determining unit is configured to determine the pointed coordinate based on the contact region detected by the region detecting unit and the proximity region detected by the proximity region detecting unit.

Additionally, an operation input method according to another aspect of the present invention includes: a step of based on detection signals output from a coordinate detecting unit, detecting a contact region in which the finger is in contact with the coordinate detecting unit, and a proximity region in which the finger is in proximity to, without contact with, the coordinate detecting unit, and the detection signals including a detection signal corresponding to a coordinate corresponding to a contact state where a finger is in contact with the coordinate detecting unit, and a detection signal corresponding to a proximity state where the finger is in proximity to, without contact with, the coordinate detecting unit; and a step of determining a pointed coordinate pointed by the finger on the coordinate detecting unit, based on the contact region detected and the proximity region detected.

Further, a program according to another aspect of the present invention has a computer execute: a step of based on detection signals output from a coordinate detecting unit, detecting a contact region in which the finger is in contact with the coordinate detecting unit, and a proximity region in which the finger is in proximity to, without contact with, the coordinate detecting unit, and the detection signals including a detection signal indicating a coordinate corresponding to a contact state where a finger is in contact with the coordinate detecting unit, and a detection signal indicating a coordinate corresponding to a proximity state where the finger is in proximity to, without contact with, the coordinate detecting unit; and a step of determining a pointed coordinate pointed by the finger on the coordinate detecting unit, based on the contact region detected and the proximity region detected.

Effects of the Invention

As described above, according to the aspects of the present invention, it is possible to achieve such an effect that an appropriate coordinate can be pointed at as intended by the user, regardless of the difference for each user in contact state of the finger on the touch pad.

BEST MODE FOR CARRYING OUT THE INVENTION

The First Embodiment

[Configuration of Mobile Terminal Device]

Figure 1:
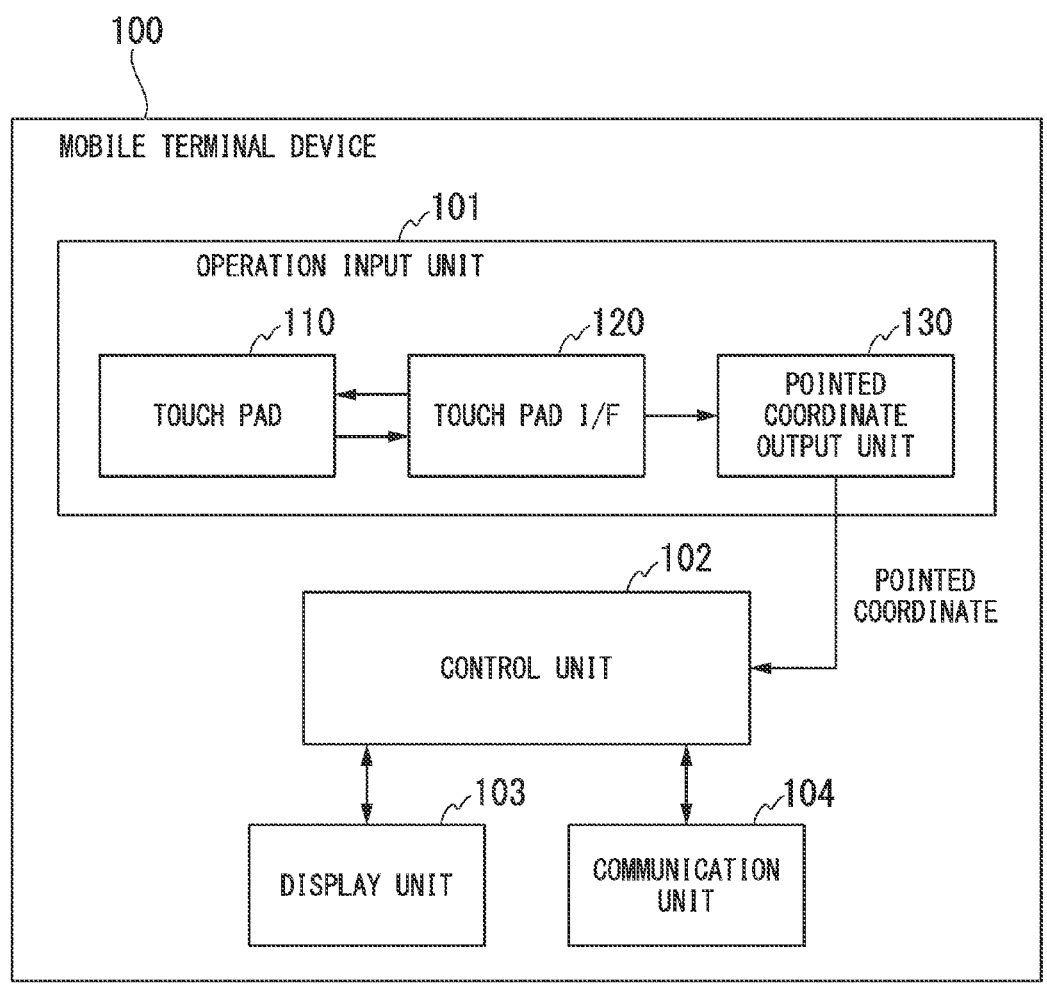
FIG. 1 is a diagram showing an example of a configuration of a mobile terminal device according to first and second embodiments.

FIG. 1 shows an example of a configuration of a mobile terminal device 100 according to a first embodiment.

The mobile terminal device 100 shown in this figure includes an operation input unit 101, a control unit 102, a display unit 103, and a communication unit 104.

The operation input unit (operation input device) 101 outputs a pointed coordinate corresponding to an operation performed on a touch pad by a user. For this reason, the operation input unit 101 includes a touch pad 110, a touch pad interface 120, and a pointed coordinate output unit 130.

The touch pad (coordinate detecting unit) 110 outputs a detection signal indicating a coordinate corresponding to a contact state of a finger in contact with the touch pad, and a detection signal indicating a coordinate corresponding to a proximity state of the finger in proximity to, without contact with, the touch pad.

Here, as one of detecting methods for the touch pad 110, for example, an electrostatic capacitance method of detecting electrostatic capacitance generated between a sensor and a finger is known. However, the detecting method for the touch pad in the present embodiment is not particularly limited.

Additionally, the touch pad 110 of the present embodiment may be combined with the display unit 103 to become part of a touch pad by which operation on an image displayed on the display unit 103 can be performed. Alternatively, the touch pad 110 may be provided on the mobile terminal device 100 as an operation unit independent of the display unit 103.

The touch pad interface 120 is a unit that inputs and outputs signals to and from the touch pad 110.

The touch pad interface 120 detects, based on a detection signal output from the touch pad 110, a contact region where a finger is in contact with the touch pad 110, and a proximity region where the finger is in proximity to, without in contact with, the touch pad 110. Additionally, the touch pad interface 120 changes and sets sensitivity of the touch pad 110. Thus, the touch pad 110 switches between normal sensitivity for outputting a detection signal corresponding only to the contact region, and high sensitivity for outputting detection signals corresponding respectively to the contact region and the proximity region.

The pointed coordinate output unit 130 determines a pointed coordinate based on information concerning only the contact region detected by the touch pad interface 120, or information concerning the contact region and the proximity region which are detected by the touch pad interface 120, and then outputs the determined pointed coordinate.

The control unit 102 performs control of each unit and various processes in the mobile terminal device 100, and thereby implements the function as the mobile terminal device 100. Here, the control unit 102 can be configured to include, for example, a CPU (central processing unit), a main storage device (RAM: random access memory), and an auxiliary storage device (a flash memory, a hard disk, and the like).

The display unit 103 displays an image in accordance with control by the control unit 102. As the display unit 103, for example, a liquid crystal display device may be used.

The communication unit 104 is a unit for communicating with another device via a predetermined communication network. As an example, in a case where the mobile terminal device 100 is a mobile phone, the communication unit 104 has a function to communicate with other mobile phones via a telephonic communication network. Additionally, in a case where the mobile terminal device 100 has a network communication function, the communication unit 104 has a function to communicate with other mobile terminal devices on the Internet or a LAN (local area network) via, for example, gateways. Further, in a case where the mobile terminal device 100 has a short-range wireless communication function such as Bluetooth (registered trademark), the communication unit 104 has a communication function corresponding to a predetermined short-range wireless communication system.

[Configuration of Operation Input Unit]

Figure 2:
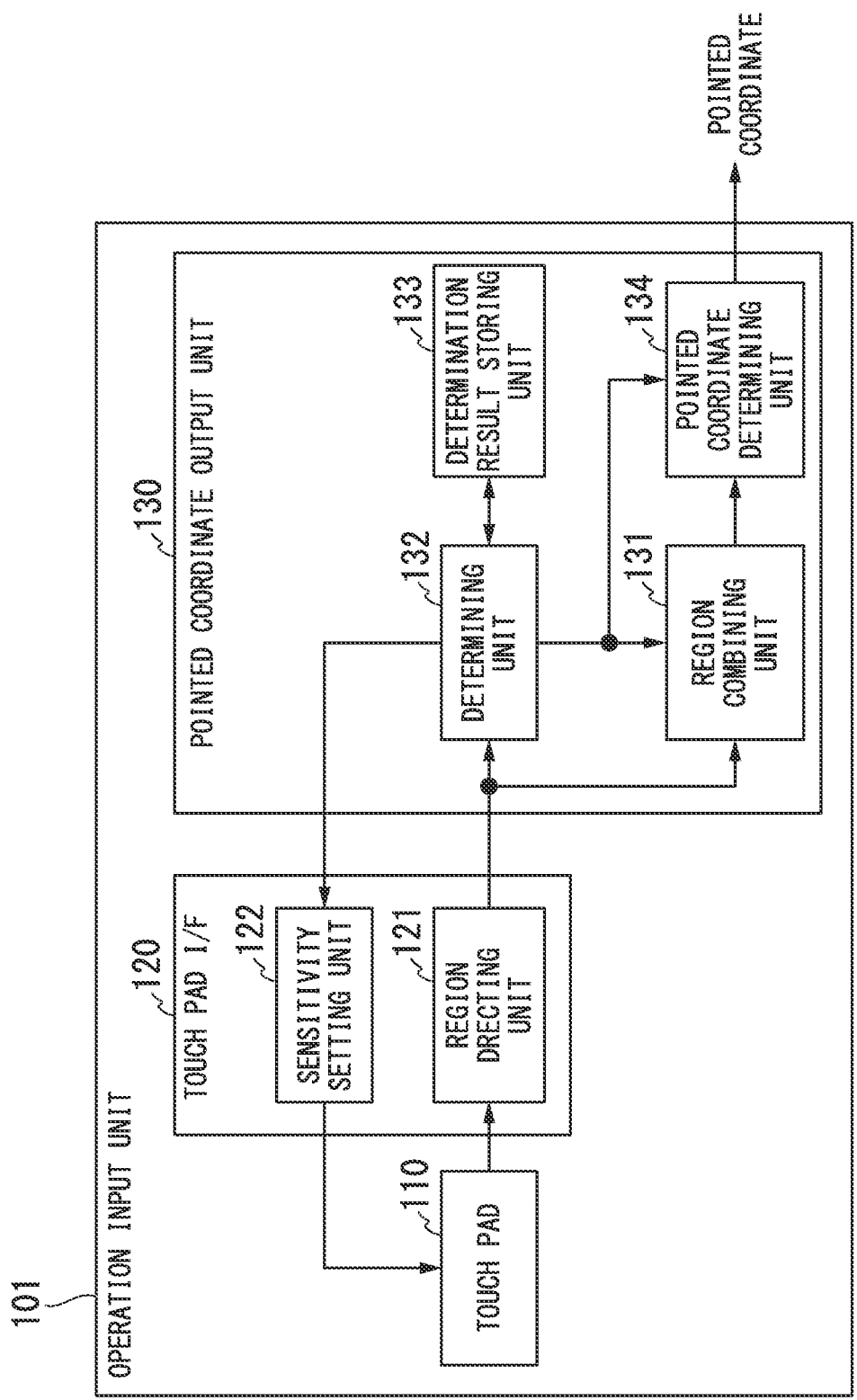
FIG. 2 is a diagram showing an example of a configuration of an operation input unit according to the first and second embodiments.

FIG. 2 shows an example of a configuration of the operation input unit 101. As also shown in FIG. 1, the operation input unit 101 includes the touch pad 110, the touch pad interface 120, and the pointed coordinate output unit 130.

Furthermore, the touch pad interface 120 includes a region detecting unit 121 and a sensitivity setting unit 122. Additionally, the pointed coordinate output unit 130 includes a region combining unit 131, a determining unit 132, a determination result storing unit 133, and a pointed coordinate determining unit 134.

The region detecting unit 121 detects, based on a detection signal output from the touch pad 110, a contact region where a finger is in contact with the touch pad 110, and a proximity region where the finger is in proximity to, without contact with, the touch pad 110. As a result of the detection, the region detecting unit 121 outputs information indicating a coordinate of the contact region on the touch pad 110 and a coordinate of the proximity region on the touch pad 110.

The sensitivity setting unit 122 sets sensitivity of the touch pad 110. As described above, the sensitivity setting unit 122 sets sensitivity of the touch pad 110 so as to switch between the normal sensitivity for outputting a detection signal corresponding only to the contact region, and the high sensitivity for outputting detection signals corresponding respectively to the contact region and the proximity region. The high sensitivity is higher than the normal sensitivity.

In a case where the normal sensitivity is set, the region detecting unit 121 detects only a contact region based on a detection signal output from the touch pad 110. In a case where the high sensitivity is set, the region detecting unit 121 detects a contact region and a proximity region based on a detection signal output from the touch pad 110.

Additionally, specifically, a change of sensitivity of the touch pad 110 can be realized by, for example, changing a resolution in a two-dimensional direction of a sensor included in the touch pad 110. In other words, at a normal resolution, the sensor of the touch pad 110 outputs a detection signal corresponding only to the contact region where a finger is in contact with the touch pad 110. On the other hand, by the resolution being set to be lower than the normal resolution, the sensor of the touch pad 110 becomes able to output not only a detection signal corresponding to the contact region, but also a detection signal corresponding to a region where the finger is in proximity to, without contact with, the sensor at a distance of up to, for example, approximately 10 mm (i.e., a proximity region). In other words, the sensitivity of the touch pad 110 becomes high.

Alternatively, by reducing a temporal resolution of the sensor of the touch pad 110 to be lower than the normal resolution, it is also possible to set to the touch pad 110, higher sensitivity than the normal sensitivity. In other words, a scan frequency of the sensor of the touch pad 110 is set to be lower than the normal frequency. Thus, the touch pad 110 operates so as to output not only a detection signal corresponding to the contact region, but also a detection signal corresponding to the proximity region.

Additionally, when high sensitivity is set to the touch pad 110, the region combining unit 131 included in the pointed coordinate output unit 130 combines a coordinate of the contact region and a coordinate of the proximity region, which are detected separately by the region detecting unit 121. As a result of the combination, the region combining unit 131 generates combined detected region information indicating the coordinate of the contact region and the coordinate of the proximity region.

Further, in a case where the normal sensitivity is set to the touch pad 110, the region combining unit 131 outputs, as a result of detection, a normal detected region signal based only on information indicating the coordinate of the contact region output from the touch pad 110.

The determining unit 132 determines whether or not to use a proximity region in determining a pointed coordinate, based on the area of the contact region detected by the region detecting unit 121.

In making this determination, the determining unit 132 determines whether or not the area of the contact region is greater than or equal to a threshold value.

In the present embodiment, a case where the area of the contact region is greater than or equal to the threshold value corresponds to a case where a finger in contact with the touch pad 110 for operation is the thumb. Additionally, in the case where the finger in contact with the touch pad 110 is the thumb, the pointed coordinate determining unit 134 uses the information concerning both the coordinate of the contact region and the coordinate of the proximity region, to determine a pointed coordinate. Therefore, if the area of the contact region is greater than or equal to the threshold value, the determining unit 132 determines to use the proximity region in determining a pointed coordinate.

On the other hand, a case where the area of the contact region is less than the threshold value corresponds to a case where a finger in contact with the touch pad 110 for operation is the index finger. In the case where the finger in contact with the touch pad 110 is the index finger, the pointed coordinate determining unit 134 uses only the information concerning the coordinate of the contact region, to determine a pointed coordinate. Therefore, if the area of the contact region is less than the threshold, the determining unit 132 determines not to use the proximity region in determining a pointed coordinate.

The determination result storing unit 133 stores a result of determination by the determining unit 132. Specifically, if it is determined that the proximity region should be used, the determining unit 132 has the determination result storing unit 133 store determination result information indicating use of the proximity region. Additionally, if it is determined that the proximity region should not be used, the determining unit 132 has the determination result storing unit 133 store determination result information indicating non-use of the proximity region. In such a configuration, the determination result information stored by the determination result storing unit 133 may be 1-bit information indicating either use or non-use of the proximity region.

The pointed coordinate determining unit 134 determines a pointed coordinate based on any one of the combined detected region information and the normal detected region information which are output by the region combining unit 131. The pointed coordinate means a coordinate pointed at by a finger on the touch pad 110.

Furthermore, if it is determined by the determining unit 132 that the proximity region should be used, the pointed coordinate determining unit 134 determines a pointed coordinate based on the detected contact region and the detected proximity region. Additionally, if it is determined that the proximity region should not be used, the pointed coordinate determining unit 134 determines a pointed coordinate based only on the detected contact region.

[Method of Determining Pointed Coordinate]

Next, with reference to FIGS. 3 and 4, description will be given with respect to a method for the operation input unit 101 having the configuration shown in FIG. 2 to determine a pointed coordinate.

First, FIGS. 3(a), 3(b), and 3(c) show, from a side surface, a state where the touch pad 110 is manipulated with an index finger 200-$f$, and also show the region detected by the touch pad 110 at that time. The index finger 200-$f$ is moving on the touch pad 110 in the direction toward the fingertip thereof (the right direction of the paper), in the order of FIGS. 3(a), 3(b), and 3(c).

The index finger 200-$f$ itself is relatively thin. For this reason, as shown in, for example, FIGS. 3(a), 3(b), and 3(c), the area of a contact region 310 where the belly of the finger is in contact with the touch pad 110 is small. Additionally, in the case of the index finger 200-$f$, even if the fingertip is moved on the touch pad 110, the index finger 200-$f$ itself is kept standing, and thus the fingertip is likely to be always stably in contact with the touch pad 110.

It is general that the position (coordinate) intended to point at by a user performing operation on the touch pad 110 is a position corresponding to the fingertip thereof.

Figure 3:
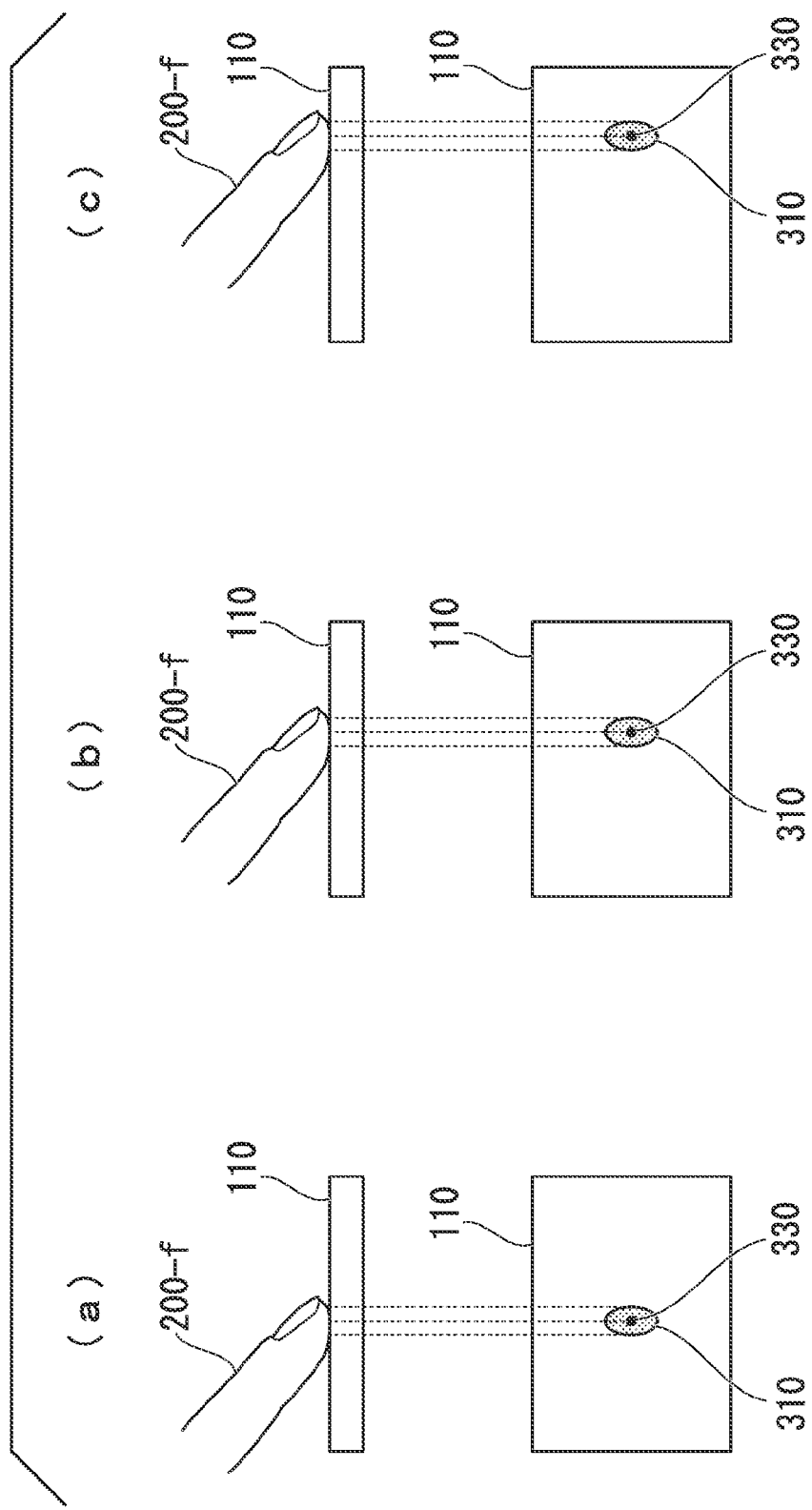
FIG. 3 is a diagram showing an example of a region to be detected by a touch pad when an operation is performed by the index finger.

In a case where operation is performed with the index finger 200-$f$ as shown in FIG. 3, the fingertip of the index finger is always in contact with the touch pad 110. Thus, in the case of the index finger, the position (coordinate) intended by the user to point at on the touch pad 110 is substantially included in the contact region 310 actually detected by the touch pad 110. Therefore, in the case of the index finger, a pointed coordinate may be determined based on information concerning the contact region 310, without using information concerning the proximity region.

On the other hand, FIGS. 4(a), 4(b), and 4(c) show, from the side surface, a state where the touch pad 110 is manipulated with a thumb 200-$t$, and also show a region detected by the touch pad 110 at that time. Additionally, the thumb 200-$t$ is moving in the direction toward the fingertip side thereof on the touch pad 110, in the order of FIGS. 4(a), 4(b), and 4(c).

The thumb 200-$t$ is considerably thick compared to the index finger 200-$f$, and accordingly, the belly of the finger is considerably wide. For this reason, as shown in FIGS. 4(a), 4(b), and 4(c), the area of the contact region 310 where the belly of the thumb 200-$t$ is in contact with the touch pad 110 is also large.

Figure 4:
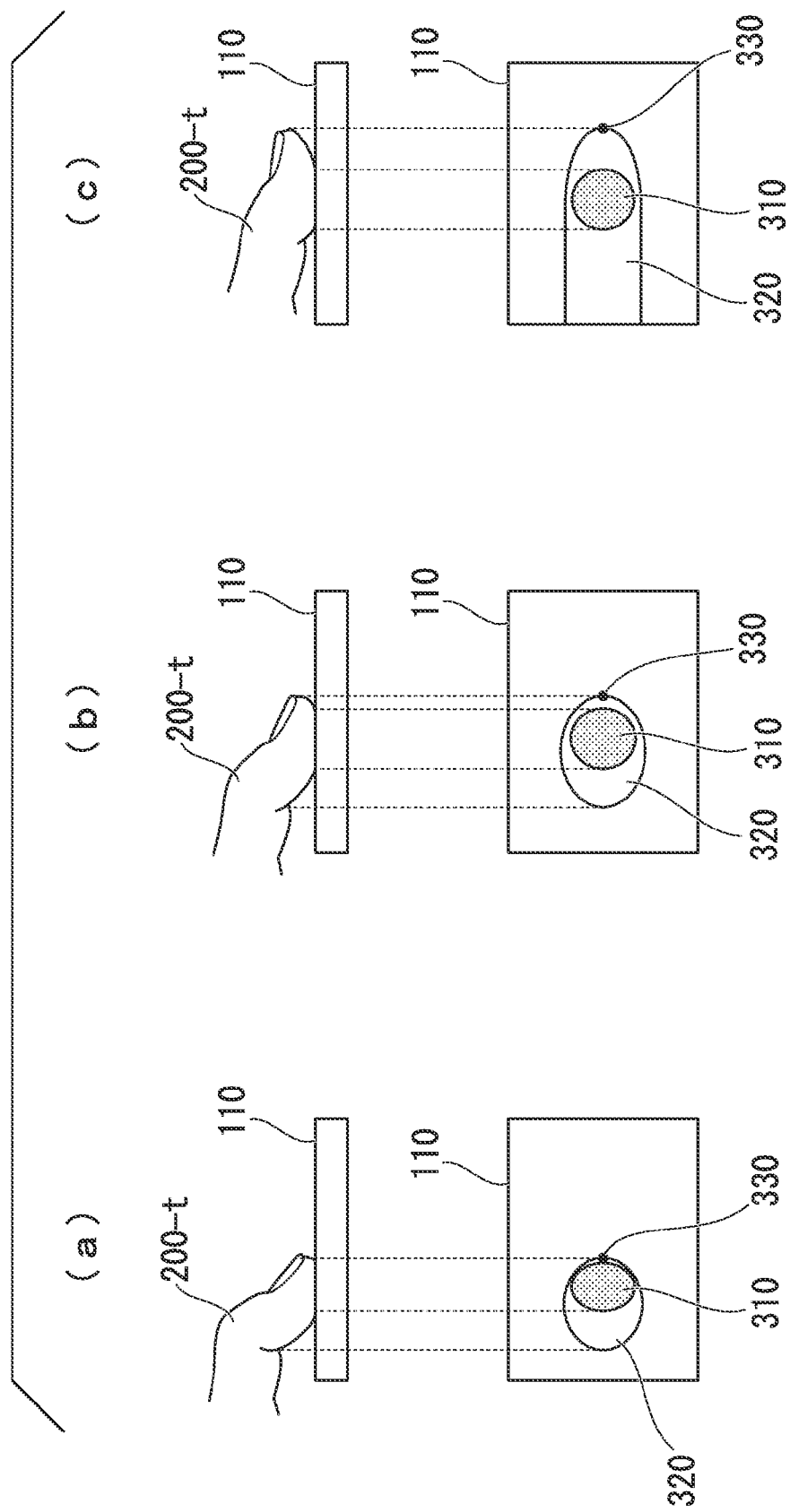
FIG. 4 is a diagram showing an example of a region to be detected by a touch pad when an operation is performed by the thumb.

Further, as shown in the order of FIGS. 4 (a), 4(b), and 4(c), in the case of the thumb 200-$t$, as the thumb is moved in the direction of the fingertip side, the fingertip thereof is gradually away from the touch pad 110. Then, instead, the belly of the thumb 200-$t$ in contact with the touch pad 110 is likely to approach the base side of the finger.

In such a case, even if the user intends to point at a certain position (coordinate) on the touch pad 110 using the fingertip of the thumb 200-$t$, the contact region 310 actually detected by the touch pad 110 is positioned closer to the base side of the thumb 200-$t$ rather than the fingertip side thereof.

In other words, in the case of the thumb 200-*t*, the position (coordinate) intended by the user to point at on the touch pad 110 is largely deviated from the contact region 310 actually detected by the touch pad 110.

In this case, if the touch pad 110 is set with high sensitivity, as shown in FIGS. 4(*a*), 4(*b*), and 4(*c*), a portion of the thumb 200-*t* in proximity to the contact portion is detected as a proximity region 320, even if that portion is not in contact with the touch pad 110. A portion of the thumb 200-*t* in proximity to the tip thereof is also included in the proximity region 320. From this point of view, in the case of the thumb, in order to meet the intention of the user, it is preferable to determine a point in proximity to the tip of the thumb 200-*t* to be a pointed coordinate 330, using the information concerning the proximity region 320.

For this reason, the determining unit 132 determines whether or not to use the proximity region 320 for determination of a pointed coordinate, in accordance with whether the finger manipulating the touch pad 110 is the thumb or the index finger. In other words, if the area of the contact region is less than the threshold value, the determining unit 132 determines not to use the proximity region in accordance with the determination that the finger manipulating the touch pad 110 is the index finger. Additionally, if the area of the contact region detected by the region detecting unit 121 is greater than or equal to the threshold value, the determining unit 132 determines to use the proximity region in accordance with the determination that the finger manipulating the touch pad 110 is the thumb.

Then, the determining unit 132 instructs the sensitivity setting unit 122 to set the normal sensitivity to the touch pad 110 in accordance with the determination not to use the proximity region. In accordance with this instruction, the sensitivity setting unit 122 sets the normal sensitivity to the touch pad 110. Thus, in the present embodiment, in a case where a finger manipulating the touch pad 110 is the index finger, the touch pad 110 is set with normal sensitivity.

The touch pad 110 set with normal sensitivity detects only the contact region 310 and outputs a detection signal.

Figure 5:
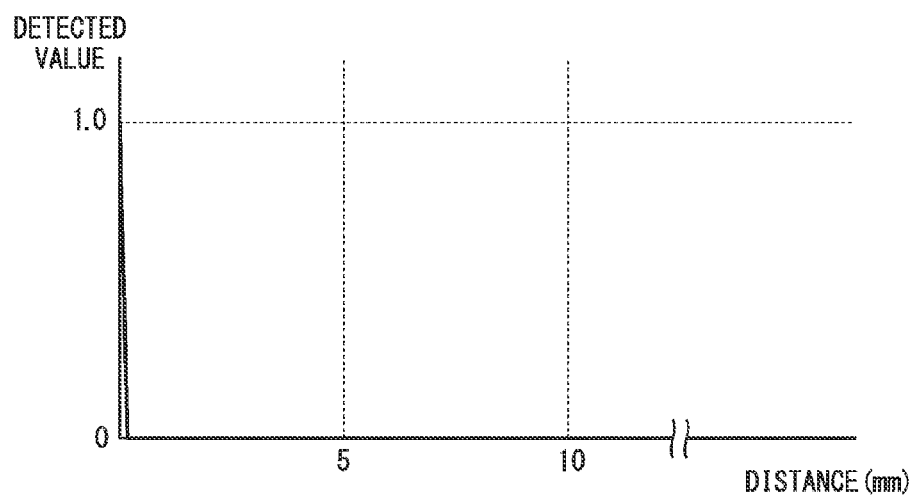
FIG. 5 is a diagram showing a relationship between a distance from the finger and a detection signal output by a touch pad set with normal sensitivity.

FIG. 5 shows a relationship between a value of the detection signal (detected value) output by the touch pad 110 set with normal sensitivity, and the distance of the finger from a surface of the touch pad 110.

As shown in this figure, in the case of the touch pad 110 set with the normal sensitivity, the detection value of "1.0" is obtained when the distance of the finger from the surface of the touch pad 110 is "0". However, as the distance becomes greater than "0", the detected value becomes "0". In other words, the touch pad 110 set with normal sensitivity operates so as to output a detection signal having the maximum value only in the state where the finger is in contact with the surface of the touch pad 110.

Figure 6:
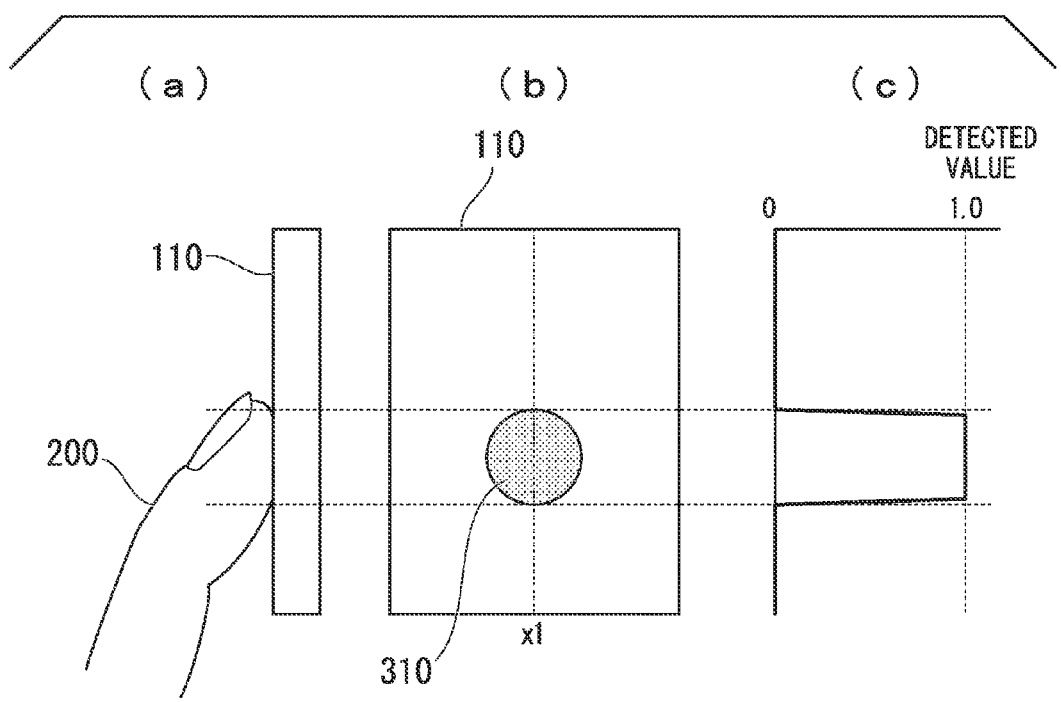
FIG. 6 is a diagram showing an example of a detection signal output by the touch pad set with the normal sensitivity.

Additionally, FIG. 6(*a*) shows, from the side surface, a state where the finger 200 is in contact with the touch pad 110. FIG. 6(*b*) shows the contact region 310 detected by the touch pad 110 set with normal sensitivity in the state shown in FIG. 6(*a*). FIG. 6(*c*) shows a distribution of the detection signals at the coordinate x1 of the touch pad 110 shown in FIG. 6(*b*).

As can be understood from these figures, the touch pad 110 set with the normal sensitivity outputs a detection signal having the maximum value "1.0" in accordance only with the coordinate of the contact region 310 where the finger 200 is in contact with the touch pad 110. Additionally, the touch pad 110 outputs a detection signal having a value "0" in accordance with the coordinate of a region other than the contact region 310, where the finger 200 is not in contact with the touch pad 110.

The region combining unit 131 in this case receives the detection signal shown in FIG. 6(*c*), and detects as the contact region 310, a region at a coordinate where the detected value is, for example, "1.0". Then, the region combining unit 131 outputs information indicating that coordinate, as the normal detected region information.

Then, the pointed coordinate determining unit 134 in this case receives the normal detected region information and determines a pointed coordinate as follows. In other words, if the normal sensitivity is set, that is, it is determined not to use information concerning the proximity region, the pointed coordinate determining unit 134 determines to be the pointed coordinate 330, the center position of the coordinate range of the contact region 310 indicated by the normal detected region information, as shown in FIG. 3.

Additionally, if it is determined to use information concerning the proximity region, in accordance with this determination, the determining unit 132 instructs the sensitivity setting unit 122 to set high sensitivity to the touch pad 110. In response to this instruction, the sensitivity setting unit 122 sets high sensitivity to the touch pad 110. Thus, in the present embodiment, in a case where a finger manipulating the touch pad 110 is the thumb, the touch pad 110 is set with high sensitivity.

Figure 7:
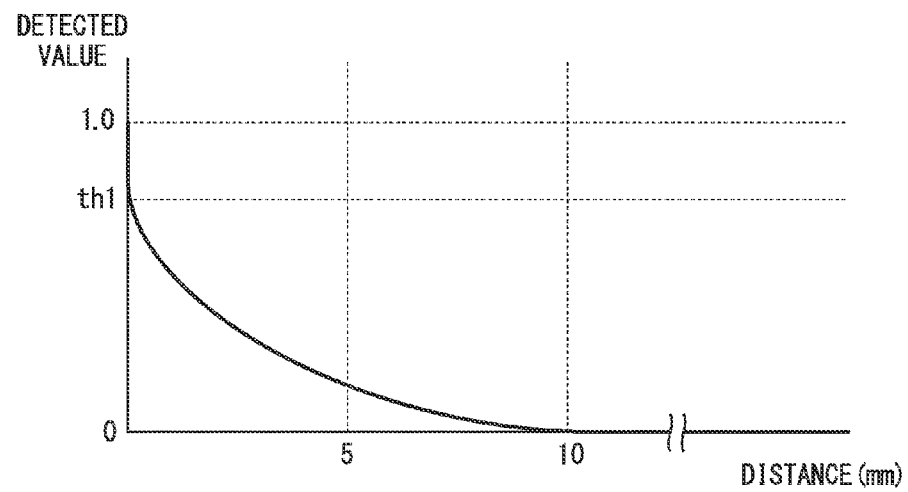
FIG. 7 a diagram showing a relationship between a distance from the finger and a detection signal output by the touch pad set with high sensitivity.

FIG. 7 shows a relationship between a value of the detection signal (detected value) output by the touch pad 110 set with high sensitivity, and the distance of the finger from the surface of the touch pad 110.

As shown in the figure, the touch pad 110 set with the high sensitivity outputs a detection signal having the value "1.0" (the maximum value), with respect to the contact region 310 where the distance of the finger from the surface of the touch pad 110 is "0". This point is the same as that in the case where the normal sensitivity is set.

Furthermore, in the case where the high sensitivity is set, the touch pad 110 outputs a detection signal having a value greater than "0", even if the distance of the finger from the surface of the touch pad is larger than "0", as long as the distance is less than a certain value (for example, approximately 10 mm). In other words, even if the finger is not in contact with the surface of the touch pad, the touch pad 110 set with high sensitivity outputs a detection signal corresponding to a portion of the finger present within a given distance from the surface of the touch pad. In other words, the touch pad 110 can detect a portion of the finger in proximity to the surface of the touch pad.

Figure 8:
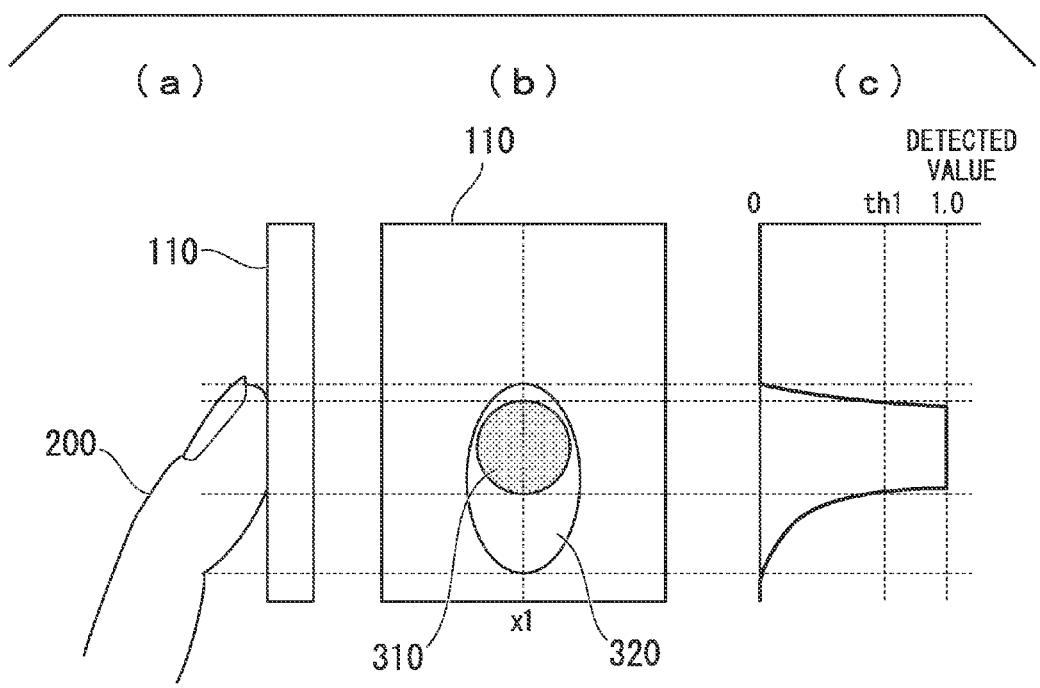
FIG. 8 is a diagram showing an example of a detection signal output by the touch pad set with the high sensitivity.

FIG. 8(*a*) shows, from the side surface, a state where the finger 200 is in contact with the touch pad 110. FIG. 8*b* shows the contact region 310 and the proximity region 320 which are detected by the touch pad 110 set with high sensitivity, in the state shown in FIG. 8(*a*). FIG. 8(*c*) shows a distribution of the detection signals at the coordinate x1 of the touch pad 110 shown in FIG. 8(*b*).

As can be understood from these figures, the touch pad 110 outputs a detection signal having the value "1.0" (the maximum value), with respect to the coordinate of the contact region 310 where the finger 200 is in contact with the touch pad 110. Furthermore, in a case where high sensitivity is set, the touch pad 110 also outputs a detection signal corresponding to the coordinate of the proximity region 320 corresponding to the portion of the finger 200 in proximity to, without contact with, the surface of the touch pad. The detection signal corresponding to the coordinate of the proximity region 320 is a signal having a value corresponding to the distance from the surface of the touch pad, which is within the range from "0" to "1.0".

Thus, in the case where the touch pad 110 is set with high sensitivity, the region detecting unit 121 receives the detected signal shown in FIG. 8(c), and detects the contact region 310 and the proximity region 320, for example, as follows.

The region detecting unit 121 receives, as a detection signal, a detected value for each coordinate of the sensor of the touch pad 110. Then, the region detecting unit 121 compares the detection value for each coordinate received to a threshold value th1 set as shown in FIGS. 7 and 8. The threshold value th1 is set so as to distinguish the detection value "1.0" corresponding to the contact region 310 from a detection value less than "1.0" corresponding to the proximity region 320.

The region detecting unit 121 detects as the contact region 310, a range consisting of coordinates corresponding to the detected values that are greater than or equal to the threshold value th1. Additionally, the region detecting unit 121 detects, as the proximity region 320, a range consisting of coordinates corresponding to the detected values that are greater than "0" and less than the threshold value th1.

The region combining unit 131 combines the coordinate range of the contact region 310 and the coordinate range of the proximity region 320, which are detected by the region detecting unit 121, to generate and output combined detected region information. As schematically shown in FIG. 8(b), the combined detected region information is information indicating the coordinate range of the contact region 310 and the coordinate range of the proximity region 320, which are on the touch pad 110.

Then, in response to, and based on, the combined detected region information output as described above, the pointed coordinate determining unit 134 determines the pointed coordinate 330. Description will be given with respect to the method of determining the pointed coordinates 330 based on the combined detected region information, while taking first to third examples.

First, with reference to FIG. 9, a first example of a pointed coordinate determining method based on the combined detected region information will be described.

First, in the first example, settings are made with respect to the coordinate of the touch pad 110 such that the origin O(0, 0) represents the coordinate of the position corresponding to the upper left vertex, an x-axis represents a horizontal direction, and a y-axis represents a vertical direction, as shown in FIGS. 9(a), 9(b), and 9(c).

Furthermore, the pointed coordinate determining unit 134 of the first example determines the pointed coordinate 330 by the following algorithm. In other words, the pointed coordinate determining unit 134 specifies a point closest to the origin O from among contact points of y-coordinates (lines in parallel to the x-axis) and the combined detected region 300 including the contact region 310 and the proximity region 320, which are indicated by the combined detected region information.

Figure 9:
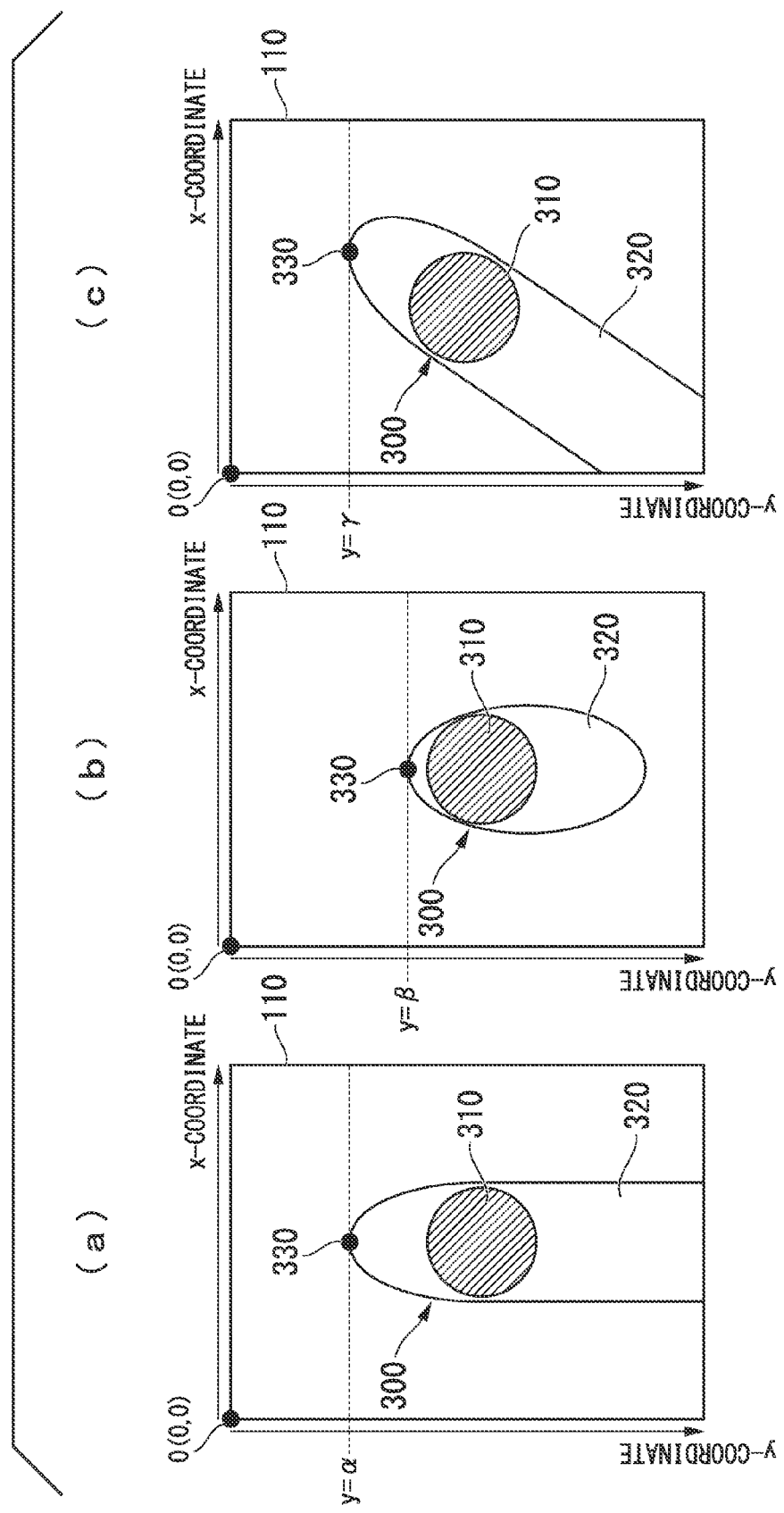
FIG. 9 is a diagram showing an example of a method of determining a pointed coordinate in a case where high sensitivity is set to the touch pad.

An example shown in FIG. 9 shows a state where a joint of the thumb is stretched in contact with the touch pad 110 while the fingertip of the thumb is oriented substantially directly above. In this case, a portion in proximity to the fingertip is proximate to the surface of the touch pad and thus is detected as the proximity region 320. Additionally, the contact region 310 is detected corresponding to a portion of the belly of the finger in contact with the surface of the touch pad. Further, a portion closer to the base side than the belly of the finger in contact with the surface of the touch pad is also in proximity to, without contact with, the surface of the touch pad, and thus is detected also as the proximity region 320.

In the state shown in FIG. 9(a), the pointed coordinate determining unit 134, by the pointed coordinate determining method of the first example, specifies the contact point of the y-coordinate represented by y=α shown in this figure with the end portion of the contour of the combined detected region 300, as a contact point closest to the origin O, and determines the specified contact point to be the pointed coordinate 330. The pointed coordinate 330 determined in this manner is the end portion, on the fingertip side, of the proximity region 320. In other words, the pointed coordinate 330 corresponds to the position of the fingertip of the thumb in proximity to the surface of the touch pad, without contact with the touch pad 110.

Additionally, FIG. 9(b) shows a state where the thumb is standing in contact with the touch pad 110. In this case, the area of the proximity region 320 in the combined detected region 300 is small. Additionally, in this state, the fingertip of the thumb is in contact with the touch pad, the contact region 310 is closer to the fingertip side.

In the case of FIG. 9(b), the pointed coordinate determining unit 134, by the pointed coordinate determining method of the first example, specifies as the contact point closest to the origin O, the contact point of the y-coordinate represented by y=β with the end portion of the contour of the proximity region 320, and determines the specified point to be the pointed coordinate 330.

Also in this case, the pointed coordinate 330 is determined so as to correspond to the position of the end portion, on the fingertip side, of the proximity region 320.

In other words, by the pointed coordinate determining method of the first example, it is possible to determine to be the pointed coordinate 330, a position corresponding to the end of the fingertip, as long as a user is manipulating the touch pad 110 while directing the fingertip upward.

Additionally, the example of FIG. 9(c) shows a state where the thumb is slightly oblique to the touch pad 110. In this case, the pointed coordinate determining unit 134, by the pointed coordinate determining method of the first example, determines to be the pointed coordinates 330, a contact point of the y-coordinate represented as y=γ with a portion of the proximity region 320 which is in proximity to the end of the contour thereof.

The pointed coordinate 330 determined in this manner is deviated slightly from the end of the fingertip, but is the position that can be regarded as substantially the end of the proximity region 320, without any problems.

Thus, by the pointed coordinate determination method of the first example, it is possible to determine an appropriate pointed coordinate 330 with ignorable errors, as long as the thumb is slightly oblique to the touch pad 110.

As can be understood from the foregoing description, the method of determining the pointed coordinate 330 described with reference to FIG. 9 is effective in the case of an embodiment such that the movement of the finger with respect to the touch pad 110 is substantially along the y-axis. If the method shown FIG. 9 is used under such an embodiment, it is possible to determine a pointed coordinate that meets the intention of the user, with relatively high precision, although the process is simple and the processing load is light. Here, as described with reference to FIG. 9(c), it is possible to determine a pointed coordinate with little errors even when the thumb is slightly oblique to the touch pad 110.

Next, with reference to FIG. 10, a second example of the pointed coordinate determining method will be described. By the pointed coordinate determination method of the second example, it is possible to appropriately determine a pointed coordinate whatever direction the finger in contact with the touch pad 110 is directed to.

FIG. 10(a) shows a state where the thumb is in contact with the touch pad 110 while being tilted in the right oblique direction.

With respect to the combined detected region 300 (the contact region 310 and the proximity region 320) shown in FIG. 10(a), the pointed coordinate determining unit 134 determines a pointed coordinate by the pointed coordinate determination method of the second example, as follows.

First, the pointed coordinate determining unit 134 obtains a center coordinate 311 of the contact region 310 and a center coordinate 321 of the proximity region 320, and then sets a straight line Lc passing the center coordinates 311 and 321.

Then, the pointed coordinate determining unit 134 obtains one coordinate of the intersection of the straight line Lc and the outer edge of the combined detected region 300 including the contact region 310 and the proximity region 320. Here, the combined detected region 300 in FIG. 10 (a) is in a state where a portion of the proximity region 320 on the base side of the thumb is extending to the lower left side of the touch pad 110. The pointed coordinate determining unit 134 does not consider to be the outer edge of the combined detected region 300, such a portion of the detected region that has reached the end portion of the touch pad 110, as described above. Therefore, the pointed coordinate determining unit 134 in this case obtains a coordinate of the end portion of the proximity region 320 on the fingertip side, as the coordinate of the intersection of the straight line Lc and the outer edge of the combined detected region 300. Then, the pointed coordinate determining unit 134 determines the coordinate obtained in this manner to be the pointed coordinate 330.

Thus, the pointed coordinate 330 determined by the pointed coordinate determining method of the second example also corresponds to a position of the fingertip of the thumb.

Figure 10:
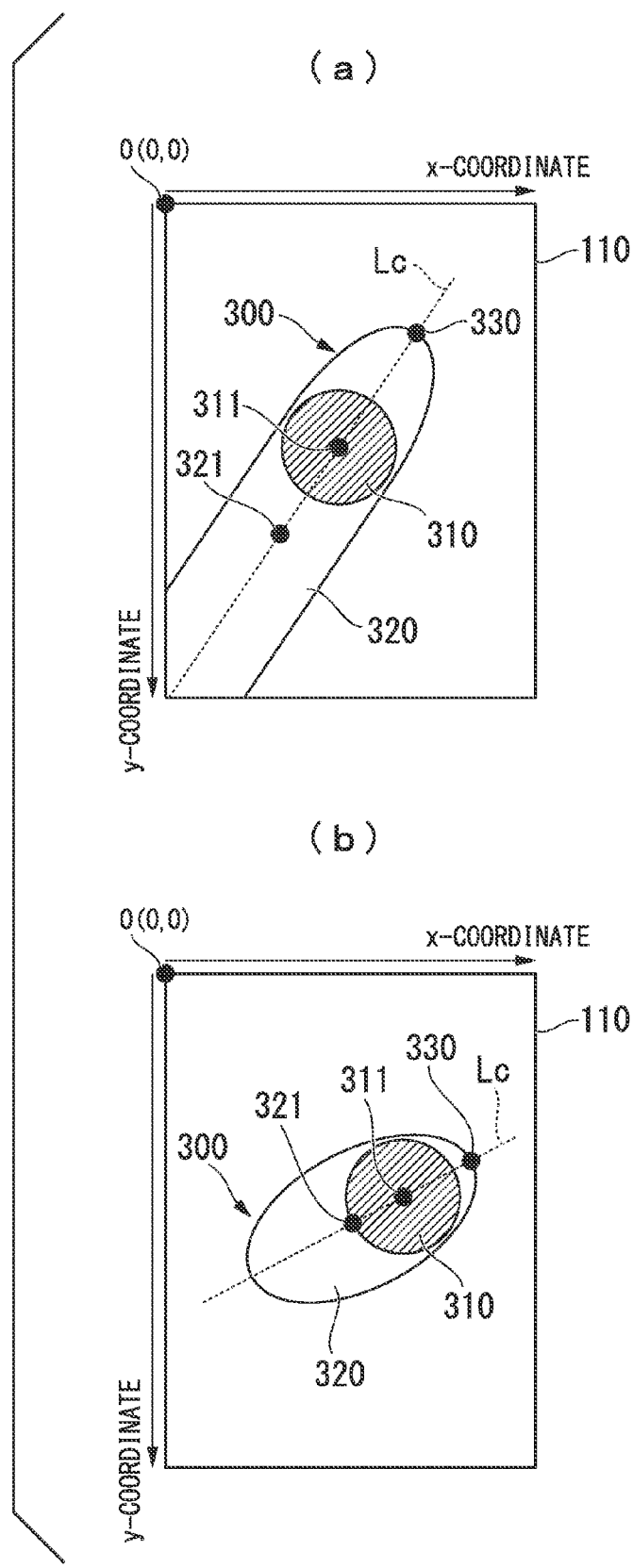
FIG. 10 is a diagram showing another example of the method of determining a pointed coordinate in the case where high sensitivity is set to the touch pad.

Additionally, the example shown in FIG. 10 (b) shows a state where the thumb is standing in contact with the touch pad 110 so that the area of the contact region 310 in the combined detected region 300 is small. In this case, the fingertip is an upper right end portion of the outer edge of the combined detected region 300, and the left lower end portion on the opposite side thereof is the side close to the base of the finger. Additionally, the thumb is oblique to the touch pad 110 almost in the lateral direction.

When the pointed coordinate determining unit 134 obtains the coordinate of the intersection of the straight line Lc and the outer edge of the combined detected region 300 by the pointed coordinate determination method of the second example in the case of the state shown in FIG. 10(b), the coordinates of two points corresponding to the end portion, on the upper right side, of the combined detected region 300 and the end portion, on the lower left side, of the combined detected region 300, are obtained. In such a case where the thumb is standing in this way, the fingertip is in contact with the touch pad 110, and therefore the contact region 310 in the combined detected region 300 is positioned closer to the fingertip. Therefore, the pointed coordinate determining unit 134 in this case determines to be the pointed coordinate 330, the coordinate closer to the contact region 310.

Thus, by the pointed coordinate determination method of the second example, the pointed coordinate determining unit 134 can accurately determine the pointed coordinate 330, regardless of the direction of the finger with respect to the touch pad 110.

Additionally, the method shown in FIG. 10 is a process of determining the intersection of the outer edge of the combined detected region 300 and the straight line Lc passing the center coordinate 311 of the contact region 310 and the center coordinate 321 of the proximity region 320, and therefore the processing load thereof is light.

Next, with reference to FIG. 11, a third example of the pointed coordinate determination method will be described.

The pointed coordinate determining unit 134 using the pointed coordinate determination method of the third example obtains an approximate straight line Ln by approximating, by the least squares method, a group of coordinates corresponding to the combined detected region 300 including the contact region 310 and the proximity region 320, which are indicated by combined detected region information, as shown in FIGS. 11(a) and 11(b). Then, the pointed coordinate determining unit 134 determines to be the pointed coordinate 330, the intersection of the approximate line Ln and the outer edge of the combined detected region 300.

By the pointed coordinate determination method of the third example, similar to the pointed coordinate determination method of the second example, it is possible to appropriately set the pointed coordinate 330, regardless of the direction of the finger to the touch pad 110. Furthermore, in the third example, it is possible to obtain the pointed coordinate 330 at sufficiently high precision by using the least squares method.

Here, for the least squares method, the pointed coordinate determining unit 134 uses all the coordinates forming the combined detected region 300, as shown in FIG. 11(c). Alternatively, for example, the pointed coordinate determining unit 134 may use coordinates extracted at regular intervals from all the coordinates forming the combined detected region 300.

Alternatively, as shown in FIG. 11(d), the pointed coordinate determining unit 134 may use the coordinates of the outer edge of the combined detected region 300 for the least squares method.

Comparing FIG. 11(c) and FIG. 11(d), it is possible to obtain the pointed coordinate 330 with higher precision in the case of FIG. 11(c) than in the case of FIG. 11(d). Additionally, the processing load caused by calculation for obtaining the pointed coordinate 330 is lighter in the case of FIG. 11(d).

Figure 11:
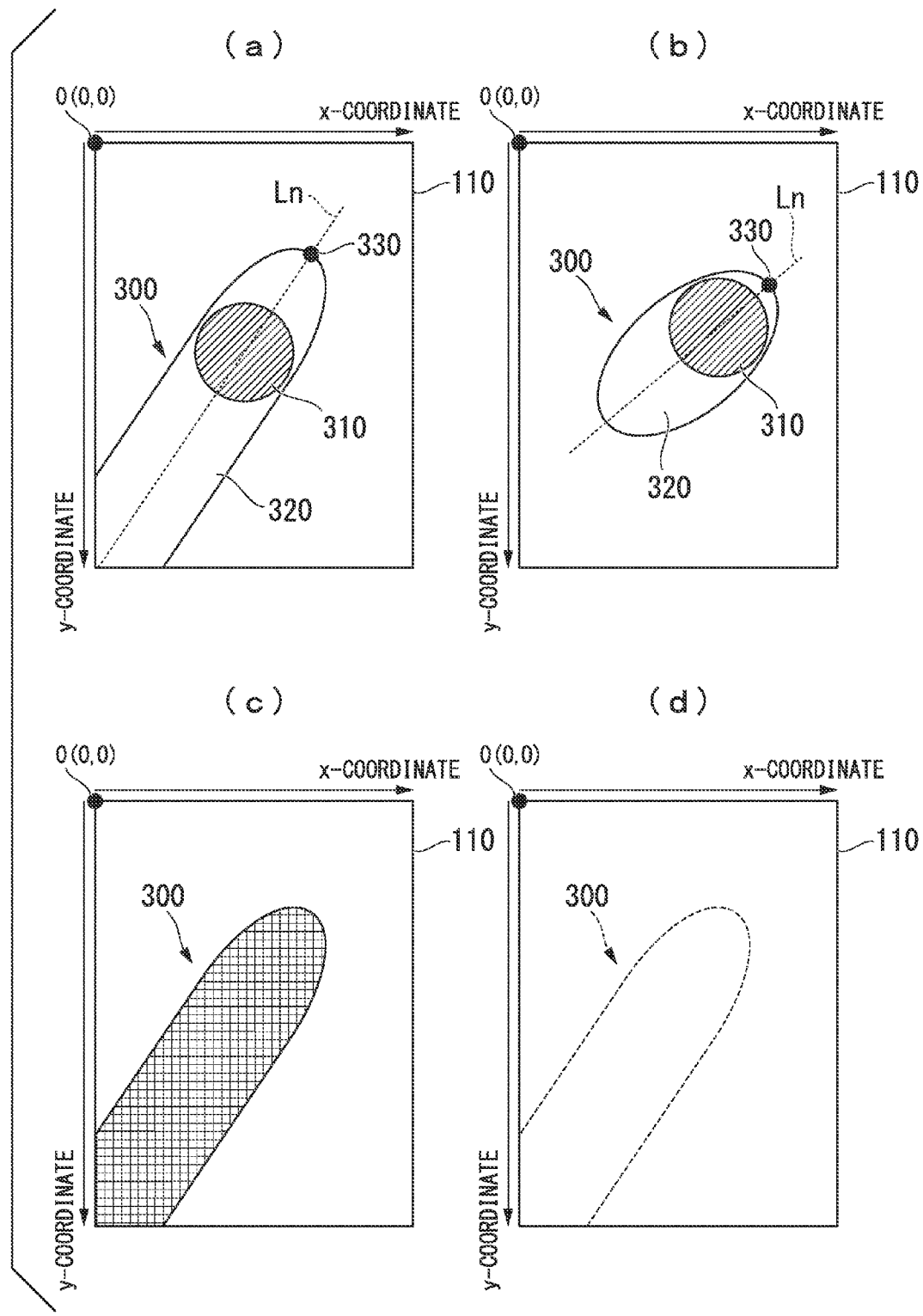
FIG. 11 is a diagram showing still another example of the method of determining a pointed coordinate in the case where high sensitivity is set to the touch pad.

Here, in any methods shown in FIGS. 9 to 11, in a case where the end side of the combined detected region 300 is the contact region 310, the end portion of the contact region 310 is determined to be the pointed coordinate 330.

Thus, by any of the pointed coordinate determination methods of the first to third examples, the pointed coordinate 330 is determined so as to correspond to the position of the fingertip. As described above, it is the fingertip that the user manipulating the touch pad 110 is intending to point at. Accordingly, in the present embodiment, it is possible to determine a pointed coordinate as intended by the user.

Furthermore, in the present embodiment, the coordinate corresponding to the position of the fingertip is obtained not by estimation, but by directly using the information detected as the proximity region 320. Thus, it is possible to specify the coordinate corresponding to the position of the fingertip of each user, regardless of individual differences, such as differences in size or contact state of a finger in contact with the touch pad 110, and thus to determine an appropriate pointed coordinate.

In the methods described with reference to FIGS. 9 to 11, the coordinate of the position corresponding to the fingertip is detected in the combined detected region 300, as a pointed coordinate. This is based on the fact that, as described above, the position on the touch pad intended by the user to point at is generally the position of the fingertip.

In some cases, however, the pointed coordinate intended by some users is on the side that is slightly closer to the belly of the finger than the fingertip.

For this reason, the pointed coordinate determining unit 134 may determine a pointed coordinate so as to be on the side closer to the belly of the finger, instead of the fingertip.

Figure 12:
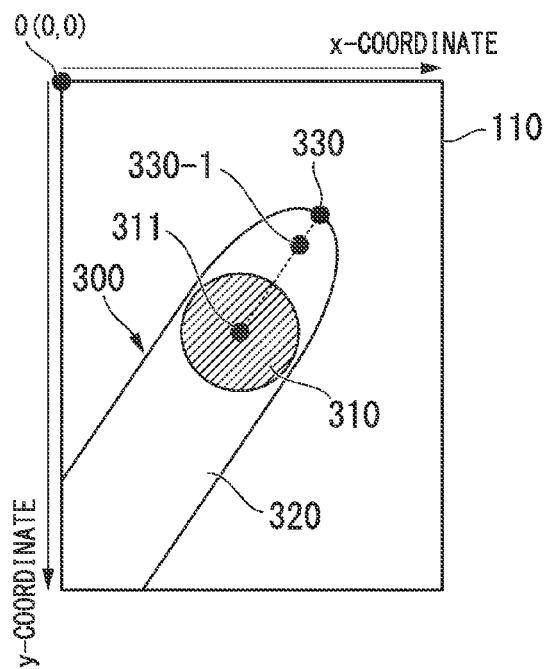
FIG. 12 is a diagram illustrating a method of determining a pointed coordinate at the position moved from the fingertip to the base side.

With reference to FIG. 12, description will be given with respect to an example of a method for the pointed coordinate determining unit 134 to determine to be the pointed coordinate 330, a position closer to the belly of the finger than the fingertip.

First, the pointed coordinate determining unit 134 determines by, for example, any one of the methods shown in FIGS. 9 to 11, the pointed coordinate 330 corresponding to the fingertip portion. However, the pointed coordinate 330 in this case is a temporarily determined coordinate.

Next, the pointed coordinate determining unit 134 obtains a coordinate that internally divides in a predetermined ratio, a line segment connecting the center coordinate 311 of the contact region 310 and the pointed coordinate 330 corresponding to the fingertip portion. Then, the pointed coordinate determining unit 134 determines the coordinate obtained in this manner to be a regular pointed coordinate 330-1.

As an example, the pointed coordinate determining unit 134 calculates the regular pointed coordinate 330-1 by the following calculation for weighted average, where (xc, yc) represents the center coordinate 311 of the contact region 310, (xt, yt) represents the pointed coordinate 330 corresponding to the fingertip portion.

$$(x,y)=(xt \times (1-p)+xc \times p, yt \times (1-p)+yc \times p)$$

Here, a weighting coefficient p may be optionally set in accordance with user operation. By setting the weighting coefficient p, the user can modify the degree of moving the pointed coordinate to the base side of the finger, in accordance with preferences or operation feeling of the user, thereby improving the operation feeling.

Additionally, as described above, the determination of whether to use the information concerning the proximity region 320 for the determination of a pointed coordinate (whether the touch pad 110 is manipulated with the thumb or the index finger) is performed by comparing the threshold value th and the area of the detected contact region 310.

In making the above determination, the determining unit 132 may use the threshold value th as a predetermined fixed value. However, there are individual differences in size of the finger. In accordance with this, a relationship between the area of the region where the thumb is in contact with the touch pad 110 and the area of the region where the index finger is in contact with the touch pad 110 also differs for each user.

Considering that the individual differences are present, as described above, it is preferable that an appropriate value of the threshold th is set for each user, depending on the individual differences in relationship between the area of the region where the thumb is in contact with the touch pad 110 and the area of the region where the index finger is in contact with the touch pad 110.

For this reason, the operation input unit 101 may change the threshold value th, for example, as described with reference to FIG. 13. Here, to describe this, an example is taken with respect to a case where the touch pad 110 is combined with the display unit 103 to form a touch pad.

For example, the user performs a predetermined operation for setting the threshold value th. In response to this operation, as shown in FIG. 13(*a*), the control unit 102 has the display unit 103 display a window to obtain the area of the contact region 310 of the thumb. The user places the thumb on a mark 400 displayed on this window so that the belly side of the thumb is in contact with the mark 400.

In response to this, the touch pad 110 outputs a detection signal corresponding to the contact region detected in the mark 400. Additionally, the region detecting unit 121 detects a coordinate range of the contact region. The determining unit 132 stores information concerning the coordinate range of the contact region of the thumb detected by the region detecting unit 121.

Figure 13:
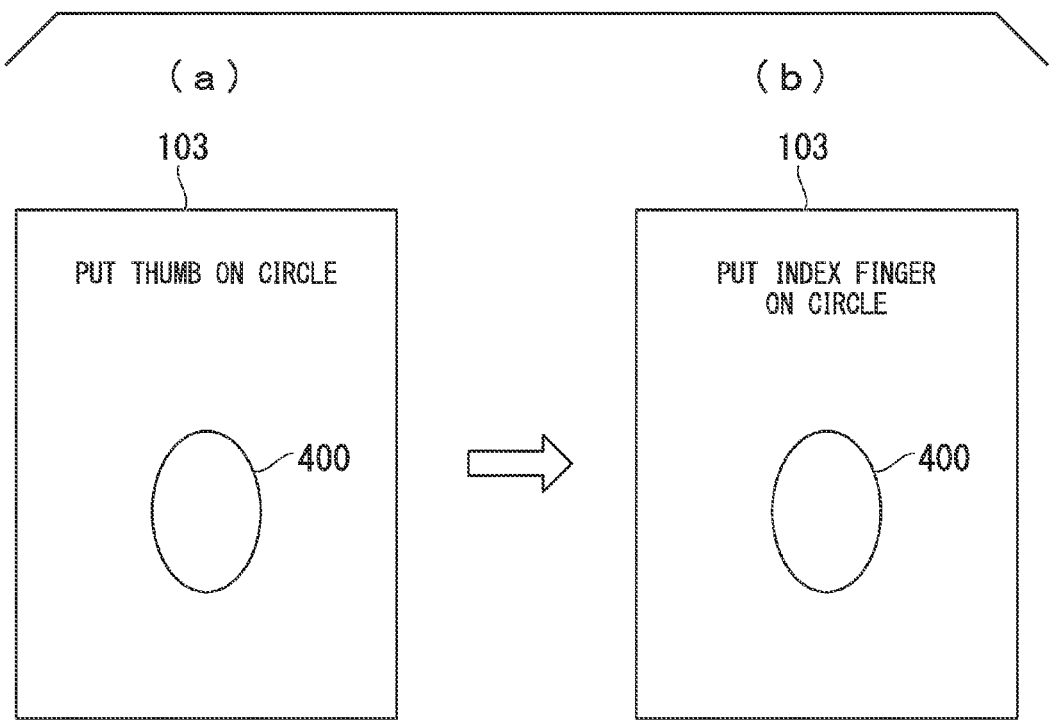
FIG. 13 shows an example of an embodiment of a setting window for a user to set a threshold value used for a determining unit of the present embodiment to determine availability of information concerning a proximity region.

Next, the control unit 102 has the display unit 103 display a window shown in FIG. 13(*b*) to obtain the area of the contact region 310 of the index finger. The user places the index finger on the mark 400 displayed on this window so that the belly side of the index finger is in contact with the mark 400. In response to this, the determining unit 132 stores information concerning a coordinate range of the contact region of the index finger detected by the region detecting unit 121.

Then, the determining unit 132 sets a threshold value th using the information concerning the coordinate range of the contact region of the thumb and the information concerning the coordinate range of the contact region of the index finger, which are stored as described above. In other words, based on the area of the region where the thumb is in contact with the touch pad 110 and the area of the region where the index finger is in contact with the touch pad 110, the determining unit 132 sets the threshold value th to be compared with the area of the contact region 310 for the determination of whether or not to use the proximity region 320.

As an example, the determining unit 132 converts the coordinate range of the contact region of the thumb into an area St and converts the coordinate range of the contact region of the index finger into an area Sf. Then, the determining unit 132 obtains an average value of these areas St and Sf, as the threshold value th. In other words, the determining unit 132 obtains the threshold value th by calculating (th=St+Sf)/2).

The determining unit 132 stores the threshold value th calculated in the above manner, and uses the threshold value th for subsequent determination. Thus, in accordance with the size of the finger of the user, the determining unit 132 can appropriately determine whether or not to use information concerning the proximity region 320 (whether the touch pad 110 is manipulated with the thumb or index finger) for the determination of a pointed coordinate.

[Example of Processing Procedure]

Figure 14:
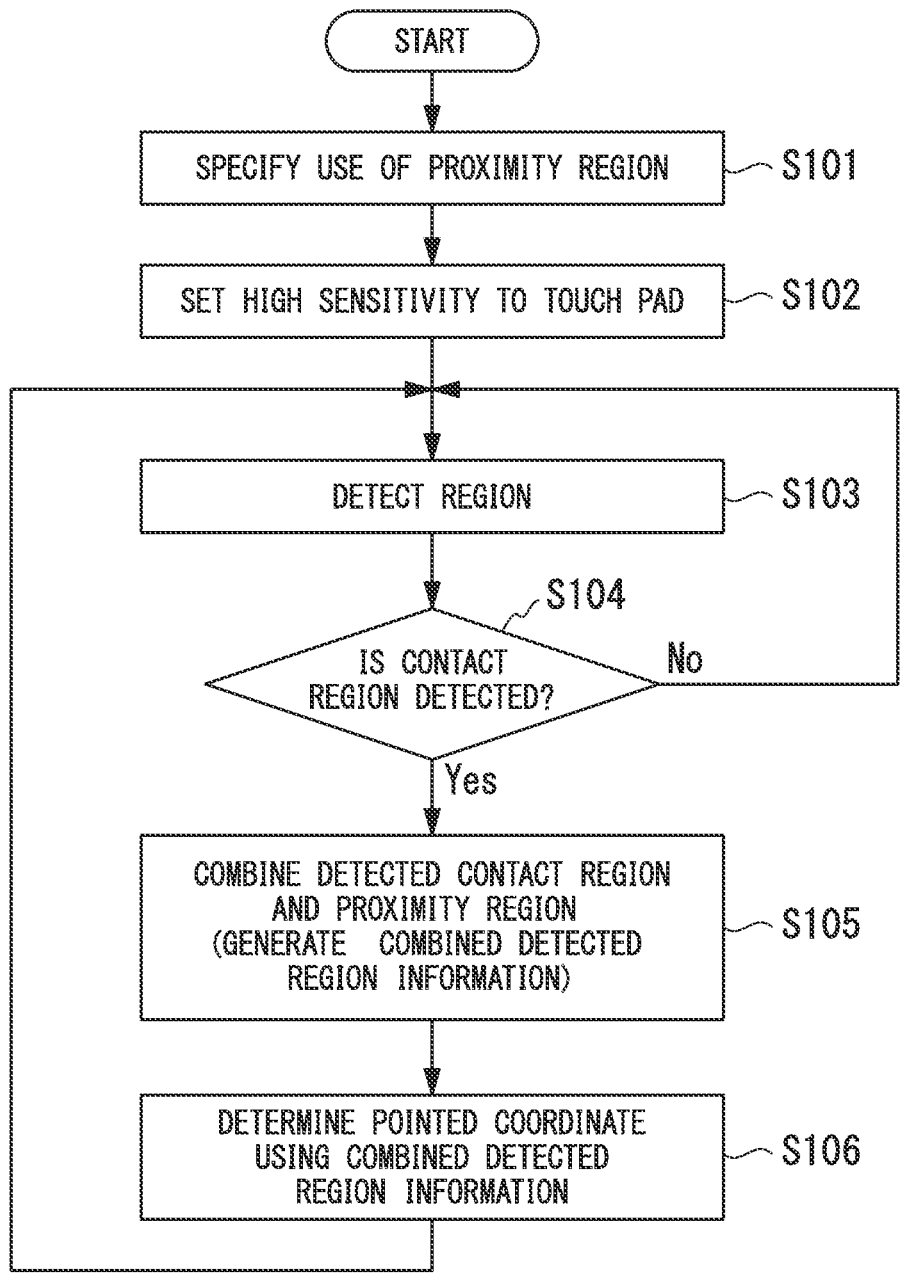
FIG. 14 is a diagram showing an example of processing procedure to be performed by an operation input unit according to the first embodiment.

The flowchart shown in FIG. 14 shows an example of processing procedure for the pointed coordinate determination to be performed by the operation input unit 101. Here, the processing shown in this figure is the most fundamental processing of the first embodiment, where high sensitivity is fixedly set to the touch pad 110, and thereby the information concerning the proximity region 320 is constantly used to determine the pointed coordinate 330.

In this case, it has been specified by, for example, previous setting that the information concerning the proximity region 320 should be used. For this reason, in accordance with the specification that the information concerning the proximity region 320 should be used, the determining unit 132 determines that the information concerning the proximity region 320 should be used (step S101). In response to this determination, the determining unit 132 instructs the sensitivity setting unit 122 to set high sensitivity to the touch pad 110 (step S102).

Thereafter, the region detecting unit 121 detects a region based on a detection signal output from the touch pad 110 (step S103). As a result of the detection of the region, the region detecting unit 121 determines whether or not the contact region 310 is detected (step S104). For this purpose, the region detecting unit 121 may determine, for example, whether there is a coordinate range where a value of the detection signal (detected value) is the maximum value "1.0".

If the contact region 310 is not detected (step S104: NO), the region detecting unit 121 returns to step S103.

On the other hand, if the contact region 310 is detected (step S104: YES), the region detecting unit 121 has detected the proximity region 320 as well as the contact region 310, as described above. For this reason, the region combining unit 131 combines the information concerning the contact region 310 and the information concerning the proximity region 320, which are detected by the region detecting unit 121, and thus generates combined detected region information (step S105).

The pointed coordinate determining unit 134 determines the pointed coordinate 330 (or the pointed coordinate 330-1) using the generated combined detected region information, by any one of the methods described with reference to FIGS. 9 to 12 (step S106). After the process in step S106 is complete, the processing returns to step S103.

Figure 15:
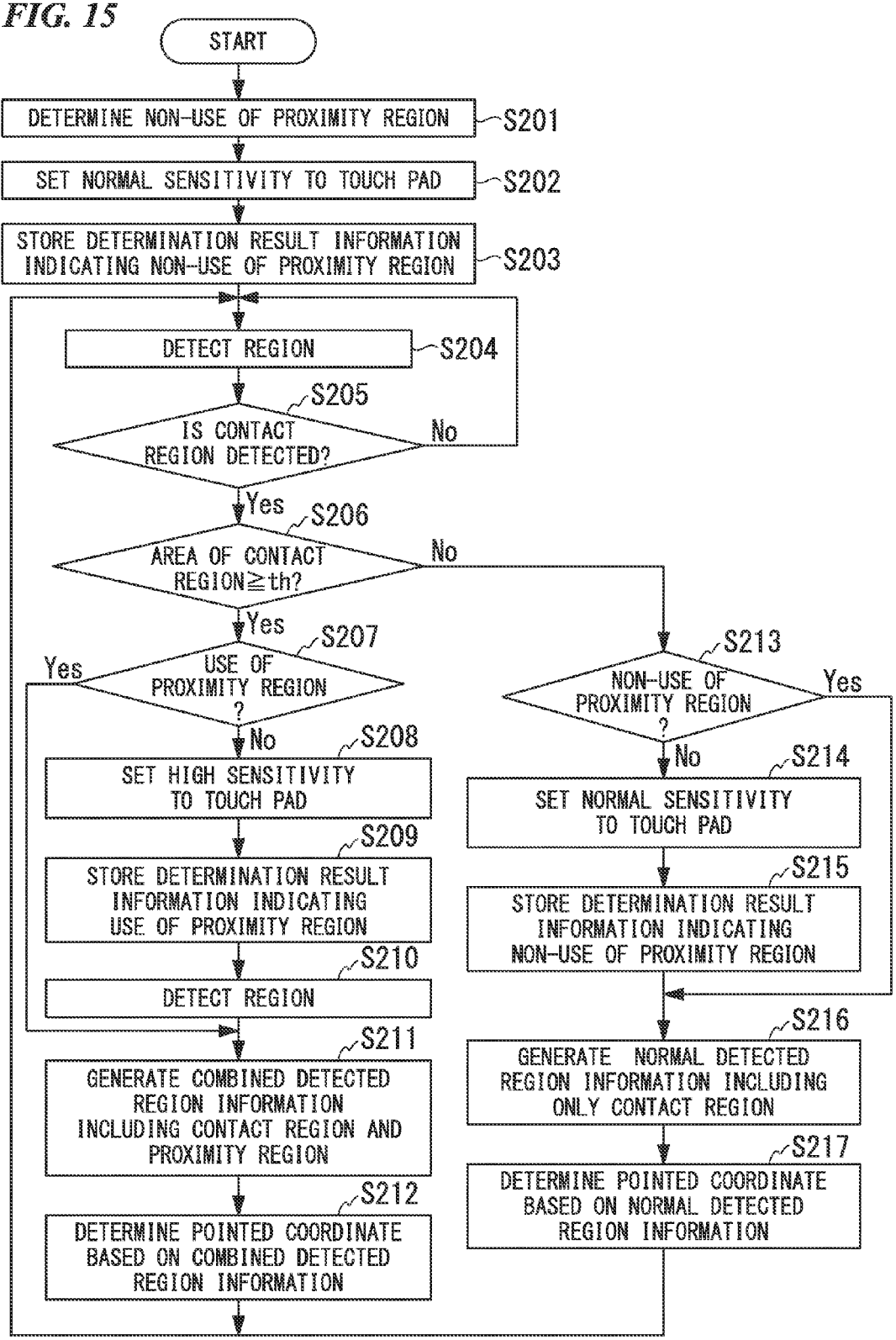
FIG. 15 is a diagram showing an example of processing procedure to be performed by the operation input unit according to the first embodiment.

The flowchart shown in FIG. 15 shows an example of processing procedure for the operation input unit 101 to change the sensitivity of the touch pad 110 and determine a pointed coordinate, in accordance with whether the finger used to manipulate the touch pad 110 is the thumb or the index finger.

As an initial determination, the determining unit 132 unconditionally determines not to use the proximity region 310, regardless of the area of the contact region 310 (step S201). Additionally, in accordance with a result of the determination, the determining unit 132 performs control for setting normal sensitivity to the touch pad 110 (step S202). Further, the determining unit 132 has the determination result storing unit 133 store determination result information indicating non-use of the proximity region as the result of the determination in step S201 (step S203).

Thereafter, the region detecting unit 121 receives a detection signal output from the touch pad 110 and performs detection of a region (step S204), and as a result of the detection of the region, determines whether or not the contact region 310 is detected (step S205).

If the contact region 310 is not detected (step S205: NO), the region detecting unit 121 returns to step S204.

On the other hand, if the contact region 310 is detected (step S205: YES), the determining unit 132 determines whether or not the area of the detected contact region 310 is greater than or equal to the threshold value th (step S206).

As can be understood from the foregoing description, the determination that the area of the contact region 310 is greater than or equal to the threshold value th corresponds to determination that the proximity region 320 should be used.

Additionally, the area of the contact region 310 is less than the threshold value th corresponds to determination that the proximity region 320 should not be used.

If it is determined that the area of the contact region 310 is greater than or equal to the threshold value th (the proximity region 320 should be used) (step S206: YES), the determining unit 132 further determines whether or not the determination result information stored in the determination result storing unit 133 indicates the use of the proximity region (step S207).

If the determination result information indicates the use of the proximity region (step S207: YES), the touch pad 110 has already been set with high sensitivity. Therefore, in this case, the processing proceeds to step S211 while skipping steps S208 to S210.

On the other hand, if the determination result information indicates the non-use of the proximity region (step S207: NO), the touch pad 110 has been set with normal sensitivity. In this case, the determining unit 132 performs control for setting the high sensitivity to the touch pad 110 (step S208). Additionally, the determining unit 132 has the determination result storing unit 133 store determination result information indicating the use of the proximity region (step S209). Here, in this process, the determining unit 132 may rewrite the determination result information so far indicating the non-use of the proximity region, with information indicating the use of the proximity region. Then, in accordance with the setting of the high sensitivity in step S208, the region detecting unit 121 receives the detection signal output from the touch pad 110, and performs detection of a region again (step S210). Thus, the region detecting unit 121 detects the coordinate range of the contact region 310 and the coordinate range of the proximity region 320.

Then, the region combining unit 131 combines the information concerning the contact region 310 and the information concerning the proximity region 320, which are detected by the region detecting unit 121, and thus generates combined detected region information (step S211).

The pointed coordinate determining unit 134 determines the pointed coordinate 330 (or the pointed coordinate 330-1) using the combined detected region information generated (step S212).

Additionally, if it is determined that the area of the contact region 310 is less than the threshold value th (the proximity region 320 should not be used) (step S206: NO), the determining unit 132 further determines whether or not the determination result information stored in the determination result storing unit 133 indicates the non-use of the proximity region (step S213).

If the determination result information indicates the non-use of the proximity region (step S213: YES), the touch pad 110 has already been set with normal sensitivity. For this reason, in this case, the processing proceeds to step S216 while skipping steps S214 to S215.

On the other hand, if the determination result information indicates the use of the proximity region (step S213: NO), the touch pad 110 has been set with high sensitivity. For this reason, the determining unit 132 performs control for setting the normal sensitivity to the touch pad 110 (step S214). Additionally, the determining unit 132 rewrites the determination result information stored by the determination result storing unit 133 with information indicating the non-use of the proximity region (step S215). Thus, the touch pad 110 outputs a detection signal corresponding only to the contact region 310, and the region detecting unit 121 operates so as to detect only a coordinate range of the contact region 310.

Therefore, the region combining unit 131 generates normal detected region information including only information concerning the contact region 310 detected by the region detecting unit 121 (step S216).

Using the generated normal detected region information, the pointed coordinate determining unit 134 determines the center position of the contact region 310 to be the pointed coordinate 330, for example, as described with reference to FIG. 3 (step S217).

After the process in step S212 or S217 is complete, the processing returns to step S204.

Here, the processing shown in FIGS. 14 and 15, for example, switching to any one of those processing may be made in accordance with setting operation by the user.

Second Embodiment

[Example of Processing Procedure]

Next, a second embodiment will be described. Here, in the second embodiment, the configurations of the mobile terminal device 100 and the operation input unit 101 may be similar to those shown in FIGS. 1 and 2.

In the first embodiment, the sensitivity of the touch pad 110 is switched between the high sensitivity and the normal sensitivity, in accordance with the determination of whether or not to use the proximity region 320.

On the other hand, in the second embodiment, the high sensitivity is fixedly set to the touch pad 110. Furthermore, if it is determined that the proximity region 320 should be used, the operation input unit 101 determines the pointed coordinate 330 (or the pointed coordinate 330-1) using information concerning the contact region 310 and the proximity region 320. Additionally, if it is determined that the proximity region 320 should not be used, the operation input unit 101 of the second embodiment determines the pointed coordinate 330 (or the pointed coordinate 330-1) using only the information concerning the contact region 310.

Figure 16:
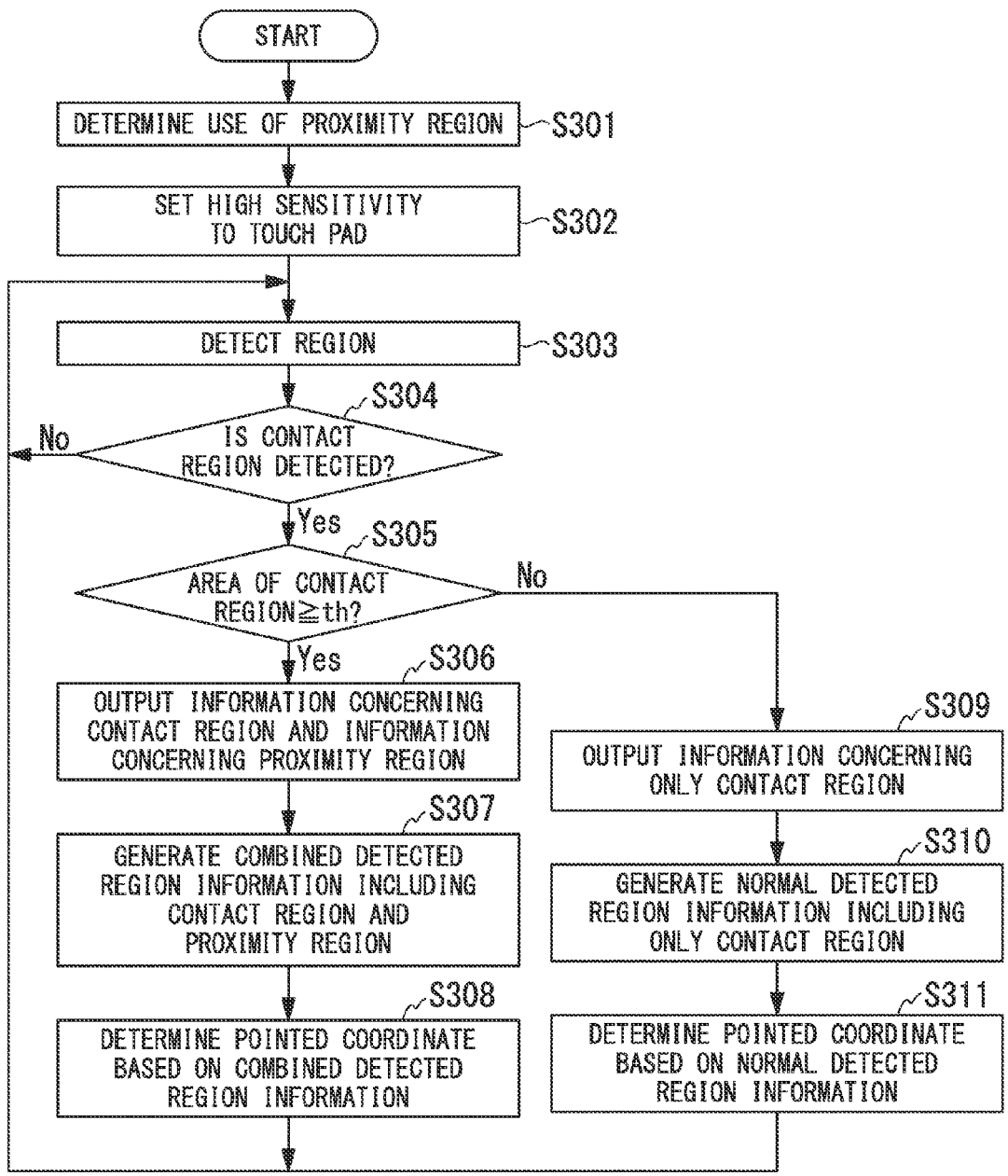
FIG. 16 is a diagram showing an example of processing procedure to be performed by an operation input unit according to the second embodiment.

The flowchart shown in FIG. 16 shows an example of processing procedure to be performed for the operation input unit 101 of the second embodiment to determine the pointed coordinate 330.

First, in the second embodiment, as an initial determination, the determining unit 132 unconditionally determines to use the proximity region 310 (step S301). Additionally, in accordance with a result of the determination, the determining unit 132 performs control for setting high sensitivity to the touch pad 110 (step S302).

Then, the region detecting unit 121 receives a detection signal from the touch pad 110 and performs detection of a region (step S303). Since high sensitivity is set to the touch pad 110, the region detecting unit 121 in step S303 detects the contact region 310 and the proximity region 320. Then, as a result of the detection of the region, the region detecting unit 121 determines whether or not the contact region 310 is detected (step S304).

If the contact region 310 is not detected (step S304: NO), the region detecting unit 121 returns to step S303.

On the other hand, if the contact region 310 is detected (step S304: YES), the determining unit 132 determines whether or not the area of the detected contact region 310 is greater than or equal to the threshold th (whether or not to use the information concerning the proximity region 320) (step S305).

If it is determined that the area of the contact region 310 is greater than or equal to the threshold value th (the proximity region 320 should be used) (step S305: YES), the region detecting unit 121 outputs information concerning the contact region 310 and information concerning the proximity region 320 (step S306).

Then, the region combining unit 131 combines the information concerning the contact region 310 and the information concerning the proximity region 320, which are detected by the region detecting unit 121, and thus generates combined detected region information (step S307).

The pointed coordinate determining unit 134 determines the pointed coordinate 330 (or the pointed coordinate 330-1) using the combined detected region information generated (step S308).

Additionally, if it is determined that the area of the contact region 310 is less than the threshold value th (the proximity region 320 should not be used) (step S305-NO), the region detecting unit 121 outputs only the information concerning the contact region 310 among the information concerning the contact region 310 and the information concerning the proximity region 320 (step S309).

In response thereto, the region combining unit 131 generates normal detected region information including only the information concerning the contact region 310 (step S310).

The pointed coordinate determining unit 134 determines the pointed coordinate 330 using the normal detected region information generated (step S311).

After the process in step S308 or S311 is complete, the processing returns to step S303.

Third Embodiment

[Configuration of Mobile Terminal Device]

Subsequently, a third embodiment will be described.

Figure 17:
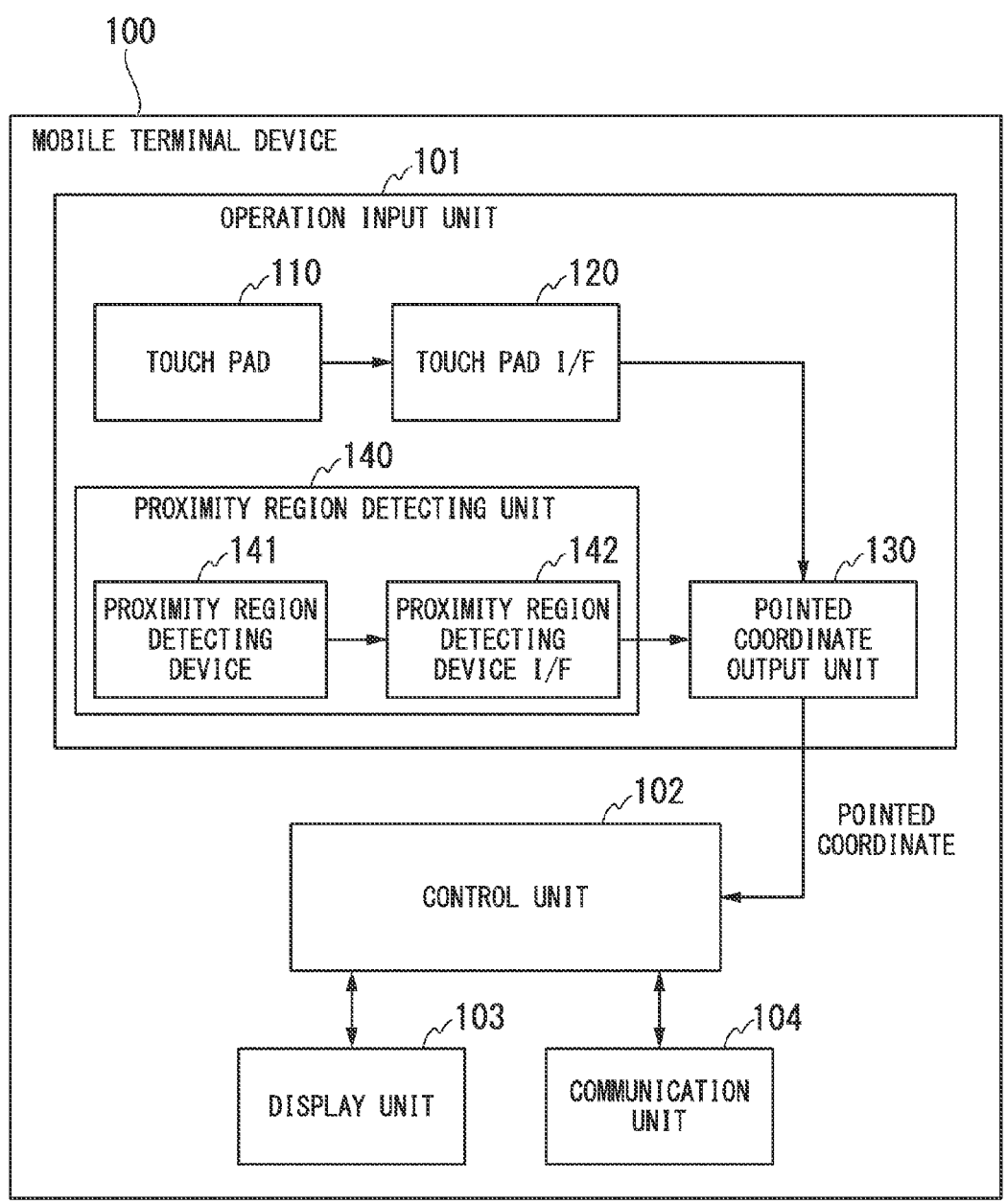
FIG. 17 is a diagram showing an example of a configuration of a mobile terminal device according to a third embodiment.

FIG. 17 shows an example of a configuration of a mobile terminal device 100 according to the third embodiment. In the figure, the same reference numerals are appended to the same portions shown in FIG. 1, and description thereof is omitted.

In the mobile terminal device 100 shown in FIG. 17, for example, the touch pad 110 is constantly set with normal sensitivity, and thus operates so as to output a detection signal corresponding only to the contact region 310. Furthermore, the mobile terminal device 100 shown in FIG. 17 further includes a proximity region detecting unit 140 in the operation input unit 101.

The proximity region detecting unit 140 includes a proximity region detecting device 141 and a proximity region detecting device interface 142.

The proximity region detecting device 141 detects the proximity region 320. As an example of the proximity region detecting device 141, it is possible to employ an optical sensor for detecting a finger in proximity to the pad surface of the touch pad 110 by detecting light or infrared ray reflected by the finger. As a specific one, a liquid crystal display device including an optical sensor is known, and such a device can be used as the proximity region detecting device 141.

Additionally, as the proximity region detecting device 141, it is possible to employ an ultrasonic sensor for detecting the finger in proximity to the pad surface of the touch pad 110 by detecting ultrasonic waves reflected by the finger.

The proximity region detecting device interface 142 receives a detection signal output from the proximity region detecting device 141 to detect a coordinate range of the proximity region 320.

The pointed coordinate output unit 130 determines a pointed coordinate using the information concerning the contact region 310 received from the touch pad interface 120, and the information concerning the proximity region 320 received from the proximity region detecting unit 140, and then outputs the determined pointed coordinate.

[Configuration of Operation Input Unit]

Figure 18:
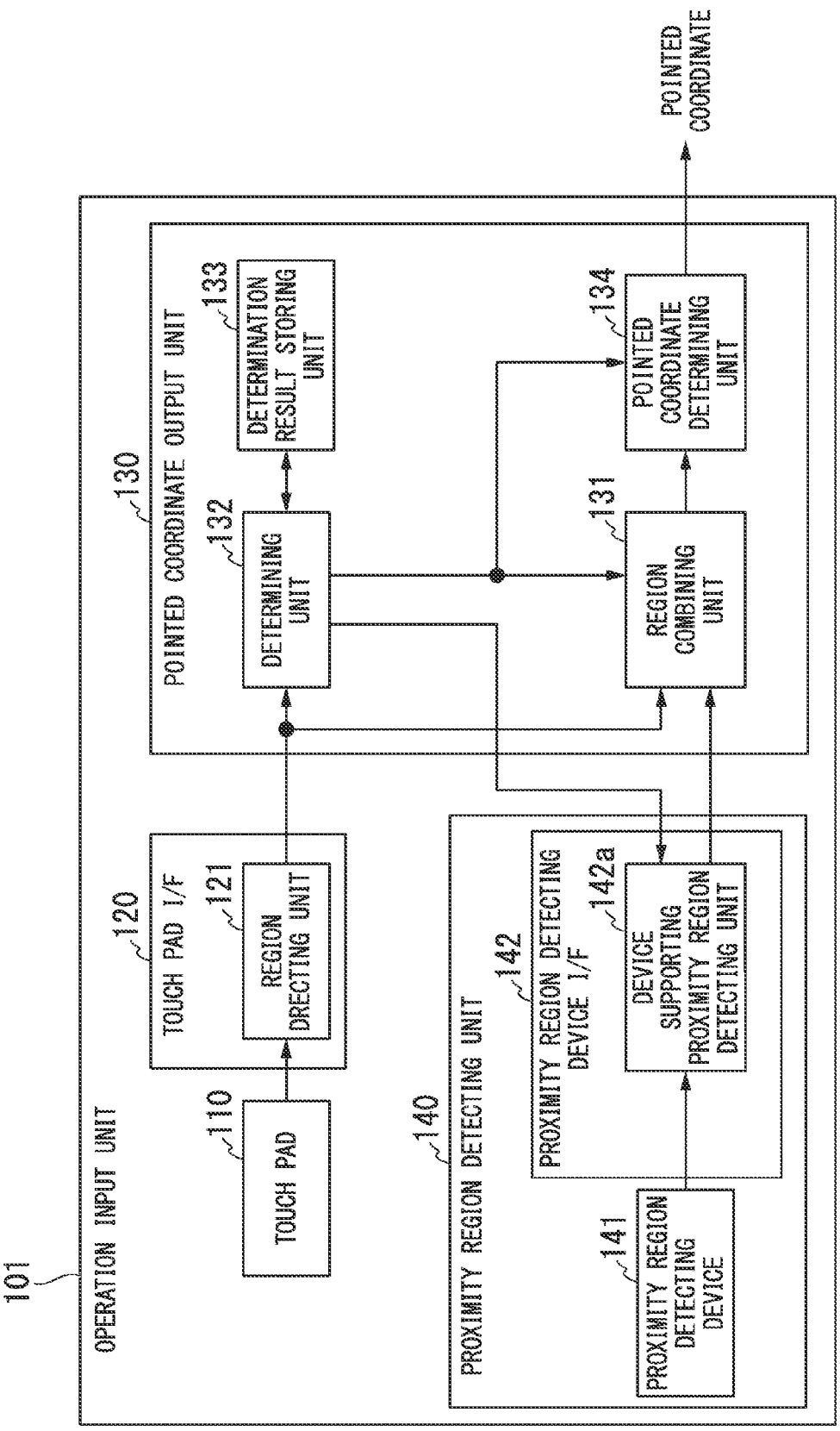
FIG. 18 is a diagram showing an example of a configuration of an operation input unit according to the third embodiment.

FIG. 18 shows an example of a configuration of the operation input unit 101 according to the third embodiment. Here, in the figure, the same reference numerals are appended to the same portions shown in FIG. 2, and description thereof is omitted.

In the operation input unit 101 shown in the figure, the touch pad interface 120 includes only the region detecting unit 121. In other words, in the third embodiment, the normal sensitivity is fixedly set to the touch pad 110, and accordingly, the sensitivity setting unit 122 is omitted. Additionally, the region detecting unit 121 of the third embodiment detects only the contact region 310 based on the detection signal output from the touch pad 110 set with the normal sensitivity.

Additionally, in FIG. 18, the proximity region detecting device interface 142 includes a device supporting proximity region detecting unit 142a. The device supporting proximity region detecting unit 142a detects a coordinate range of the proximity region 320 based on the detection signal output from the proximity region detecting device 141. Additionally, on-off operation of the device supporting proximity region detecting unit 142a is controlled by the determining unit 132.

In the third embodiment, if it is determined that information concerning the proximity region 320 should be used, the determining unit 132 performs control for turning on detection operation of the device supporting proximity region detecting unit 142a. Thus, the region combining unit 131 receives the information concerning the contact region 310 detected by the region detecting unit 121 and the information concerning the proximity region 320 detected by the device supporting proximity region detecting unit 142a, and then generates combined detected region information.

The pointed coordinate determining unit 134 in this case determines the pointed coordinates 330 (or the pointed coordinate 330-1) using information concerning the coordinate ranges of the contact region 310 and the proximity region 320, which are indicated by the combined detected region information.

On the other hand, if it is determined that the information concerning the proximity region 320 should not be used, the determining unit 132 performs a control for turning off the detection operation of the device supporting proximity region detecting unit 142a. Thus, the information concerning the proximity region 320 is not output from the device supporting proximity region detecting unit 142a. For this reason, the region combining unit 131 generates normal detected region information including only the information concerning the contact region 310 detected by the region detecting unit 121.

Then, the pointed coordinate determining unit 134 determines the pointed coordinate 330 using the information concerning the coordinate range of the contact region 310 indicated by the normal detected region information.

[Example of Processing Procedure]

Figure 19:
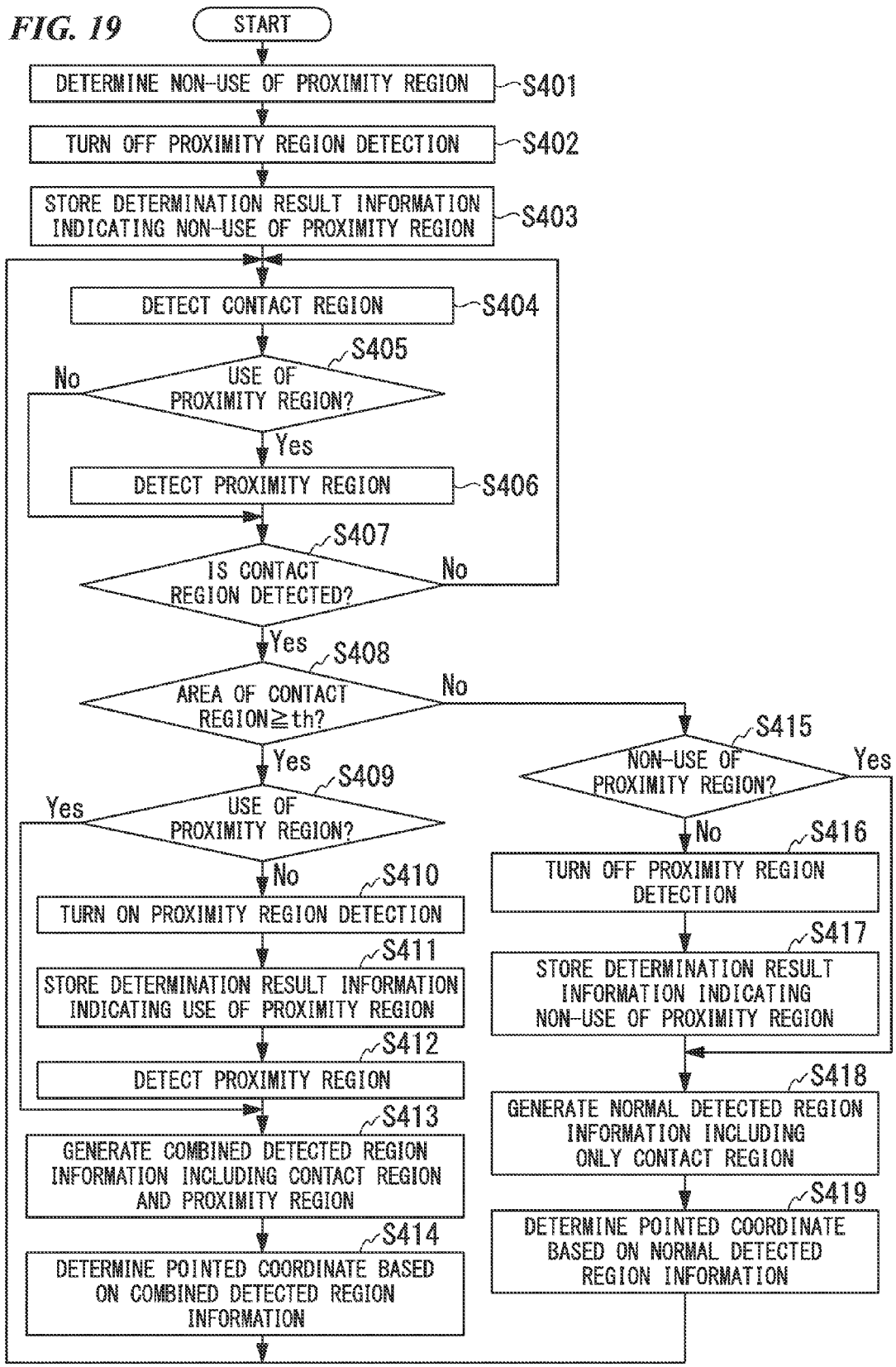
FIG. 19 is a diagram showing an example of processing procedure to be performed by the operation input unit according to the third embodiment.

The flowchart shown in FIG. 19 shows an example of processing procedure to be performed for the operation input unit 101 of the third embodiment to determine a pointed coordinate.

First, as an initial determination, the determining unit 132 unconditionally determines not to use the proximity region, regardless of the area of the contact region 310 (step S401).

Additionally, in accordance with a result of the determination in step S401, the determining unit 132 turns off the detection operation of the device supporting proximity region detecting unit 142a (step S402). Thus, information concerning the proximity region 320 will not be output from the device supporting proximity region detecting unit 142a.

Further, the determining unit 132 has the determination result storing unit 133 store determination result information indicating the non-use of the proximity region, which is the result of the determination in step S401 (step S403).

Thereafter, the region detecting unit 121 receives a detection signal output from the touch pad 110 and performs detection of the contact region 310 (step S404).

Next, the determining unit 132 determines whether or not the determination result information stored in the determination result storing unit 133 indicates the use of the proximity region (step S405).

If the determination result information indicates the use of the proximity region (step S405: YES), the detection operation of the device supporting proximity region detecting unit 142a has been turned on. For this reason, the device supporting proximity region detecting unit 142a receives a detection signal from the proximity region detecting device 141, and thus performs detection of the proximity region 320 (step S406).

On the other hand, if the determination result information indicates the non-use of the proximity region (step S405: NO), the detection operation of the device supporting proximity region detecting unit 142a has been turned off. Thus, the device supporting proximity region detecting unit 142a in this case does not perform the detection of the proximity region 320 by skipping step S406.

Subsequently, based on a result of the detection of a contact region in step S404, the region detecting unit 121 determines whether or not the contact region 310 is detected (step S407).

If the contact region 310 is not detected (step S407: NO), the region detecting unit 121 returns to step S404.

On the other hand, if the contact region 310 is detected (step S407: YES), the determining unit 132 determines whether or not the area of the detected contact region 310 is greater than or equal to the threshold value th (step S408).

If it is determined that the area of the contact region 310 is greater than or equal to the threshold value th (the proximity region 320 should be used) (step S408: YES), the determining unit 132 further determines whether or not the determination result information stored in the determination result storing unit 133 indicates the use of the proximity region (step S409).

If the determination result information indicates the use of the proximity region (step S409: YES), the detection operation of the device supporting proximity region detecting unit 142a has been turned on. Therefore, in this case, the processing proceeds to step S413 while skipping steps S410 to S412.

On the other hand, if the determination result information indicates the non-use of the proximity region (step S409: NO), the detection operation of the device supporting proximity region detecting unit 142a has been turned off. In this case, the determining unit 132 turns on the detection operation of the device supporting proximity region detecting unit 142a (step S410). Additionally, the determining unit 132 rewrites the determination result information stored by the determination result storing unit 133 with information indicating the use of the proximity region (step S411). Then, in response to the detection operation of the device supporting proximity region detecting unit 142a being turned on, the device supporting proximity region detecting unit 142*a* receives a detection signal from the proximity region detecting device 141, and performs detection of the proximity region 320 (step S412). Thus, the region combining unit 131 receives the information concerning the proximity region 320 detected by the device supporting proximity region detecting unit 142*a*, and the information concerning the contact region 310 detected by the region detecting unit 121.

Therefore, the region combining unit 131 combines the information concerning the proximity region 320 detected by the device supporting proximity region detecting unit 142*a*, and the information concerning the contact region 310 detected by the region detecting unit 121, and thus generates combined detected region information (step S413).

The pointed coordinate determining unit 134 determines the pointed coordinate 330 (or the pointed coordinate 330-1) using the combined detected region information generated (step S414).

Additionally, if it is determined that the area of the contact region 310 is less than the threshold value th (the proximity region 320 should not be used) (step S408: NO), the determining unit 132 further determines whether or not the determination result information stored in the determination result storing unit 133 indicates the non-use of the proximity region (step S415).

If the determination result information indicates the non-use of the proximity region (step S415: YES), the detection operation of the device supporting proximity region detecting unit 142*a* has already been turned off. For this reason, in this case, the processing proceeds to step S418 while skipping steps S416 to S417.

On the other hand, if the determination result information indicates the use of the proximity region (step S415: NO), the detection operation of the device supporting proximity region detecting unit 142*a* has been turned on. For this reason, the determining unit 132 turns off detection operation of the device supporting proximity region detecting unit 142*a* (step S416). Additionally, the determining unit 132 rewrites the determination result information stored by the determination result storing unit 133 with information indicating the non-use of the proximity region (step S417). Thus, the device supporting proximity region detecting unit 142*a* terminates the detection operation. Consequently, the region combining unit 131 receives only the information concerning the contact region 310 detected by the region detecting unit 121.

Therefore, the region combining unit 131 generates normal detected region information including only the information concerning the contact region 310 detected by the region detecting unit 121 (step S418).

Using the generated normal detected region information, the pointed coordinate determining unit 134 determines the center position of the contact region 310 to be the pointed coordinate 330, for example, as described with reference to FIG. 3 (step S419).

After the process in step S414 or S419 is complete, the processing returns to step S404.

Here, also in the third embodiment, similar to the flow-chart shown in FIG. 14, the pointed coordinate may be detected while the device supporting proximity region detecting unit 142*a* is fixedly turned on.

<Example of Arrangement of Touch Pad in Mobile Terminal Device>

Figure 20:
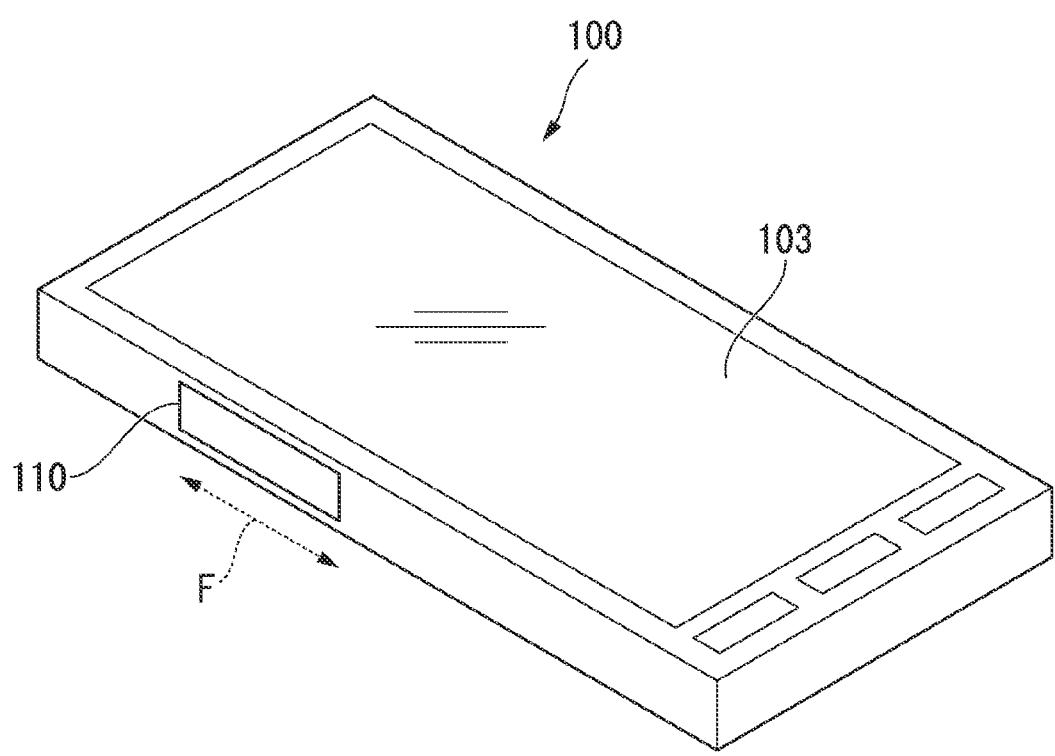
FIG. 20 is a diagram showing an example of an embodiment of arrangement of the touch pad corresponding to the first and second embodiments.

FIG. 20 shows one example of an embodiment of arrangement of the touch pad 110 of the mobile terminal device 100 of the first and second embodiments.

For example, the mobile terminal device 100 shown in FIG. 20 has a configuration in which information processing functions are incorporated in a mobile phone, such as a smart phone. In the mobile terminal device 100, as shown in the figure, the touch pad 110 has a rectangular shape with the predetermined width and length, and is provided on a side surface of a housing.

With respect to the touch pad 110 provided as shown in FIG. 20, while carrying the mobile terminal device 100 with the left hand, a user performs manipulation so as to slide the thumb of the same left hand along the direction indicated by an arrow F. Such manipulation on the touch pad 110 is useful to be applied to, for example, a screen scrolling or a volume control, depending on an application running on the mobile terminal device 100.

Figure 21:
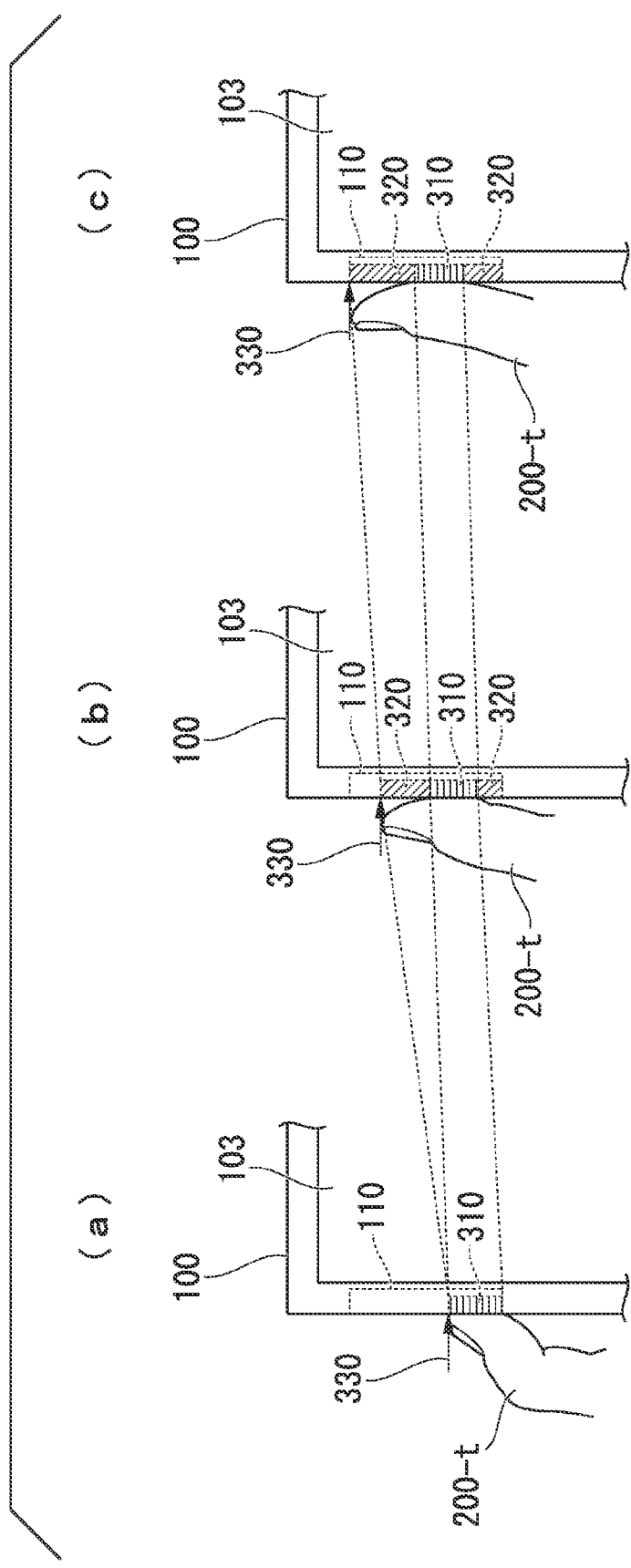
FIG. 21 is a diagram showing an example of a state of a contact region and a proximity region which are detected by operation on the touch pad shown in FIG. 20.

FIG. 21 shows a relationship among a state of the thumb 200-*t*, and the contact region 310 and the proximity region 320 which are detected on the touch pad 110, when slide manipulation is performed with the thumb 200-*t* on the touch pad 110 provided as shown in FIG. 20. To describe the figure, the touch pad 110 is assumed to be set with high sensitivity.

Here, the user performs manipulation so as to slide the thumb 200-*t* in the direction from the bottom to the top of the touch pad 110, in the order of FIGS. 21(*a*), 21(*b*), and 21(*c*).

First, in the state shown in FIG. 21(*a*), a portion from the fingertip to the first joint of the thumb 200-*t* is standing. At this time, as shown in the figure, the touch pad 110 enters a state of outputting a detection signal corresponding to the contact region 310 in a region in proximity to the fingertip of the thumb 200-*t*.

Next, FIG. 21(*b*) shows a state where a certain time has lapsed from the state shown in FIG. 21(*a*), and thus the fingertip of the thumb 200-*t* has been moved to the proximity of the middle of the touch pad 110. At this time, the first joint of the thumb 200-*t* has been stretched, and thereby the fingertip of the thumb 200-*t* is detached from the pad surface of the touch pad 110, and thus the belly of the finger is in contact with the pad surface. In this state, the touch pad 110 detects the proximity region 320 corresponding to the fingertip side of the thumb 200-*t* detached from the pad surface, and detects the contact region 310 corresponding to the belly of the thumb 200-*t* in contact with the pad surface below the proximity region 320. Additionally, the touch pad 110 detects the proximity region 320 corresponding to the base side of the thumb 200-*t* detached from the pad surface below the contact region 310.

Next, FIG. 21(*c*) shows a state where a certain time has further lapsed from the state shown in FIG. 21(*b*), and thus the fingertip of the thumb 200-*t* has been moved to the upper end side of the touch pad 110. At this time, the fingertip of the thumb 200-*t* is warped upward (in the left direction of the paper) and thus is detached from the pad surface of the touch pad 110, and the belly of the finger on the base side is in contact with the pad surface.

In this state, the touch pad 110 detects the proximity region 320 corresponding to the fingertip side of the thumb 200-*t* detached from the pad surface, and detects the contact region 310 corresponding to the portion in contact with the belly of the thumb 200-*t* below the proximity region 320. Further, also in this case, the touch pad 110 detects the proximity region 320 corresponding to the base side of the thumb 200-*t* detached from the pad surface below the contact region 310.

In this case, for example, when the pointed coordinate 330 is determined based only on the contact region 310, the pointed coordinate 330 does not follow the upward movement of the fingertip of the thumb 200-*t*, and moves only to the middle of the touch pad 110, as can be understood from FIG. 21.

In this case, a large difference occurs between the movement of the pointed coordinate intended by the user through the slide manipulation of the thumb 200-*t*, and the movement of the pointed coordinate actually detected. Particularly, the manipulation shown in FIG. 21 is performed such that while holding the mobile terminal device 100 with the left hand, the user slides the thumb 200-*t* of the same left hand on the touch pad 110. In this case, the left hand itself cannot be moved in the sliding direction, and the joints of the thumb 200-*t* are bent or stretched to perform the slide manipulation, thereby making it likely to generate warpage on the fingertip side, as shown in FIG. 21(*c*).

However, the mobile terminal device 100 of the present embodiment is provided with the operation input unit 101 described so far. For this reason, as shown in FIG. 21, the pointed coordinate 330 always becomes the position corresponding to the fingertip of the thumb 200-*t*. Thus, it is possible to obtain the movement of the pointed coordinate, as intended by the user.

Figure 22:
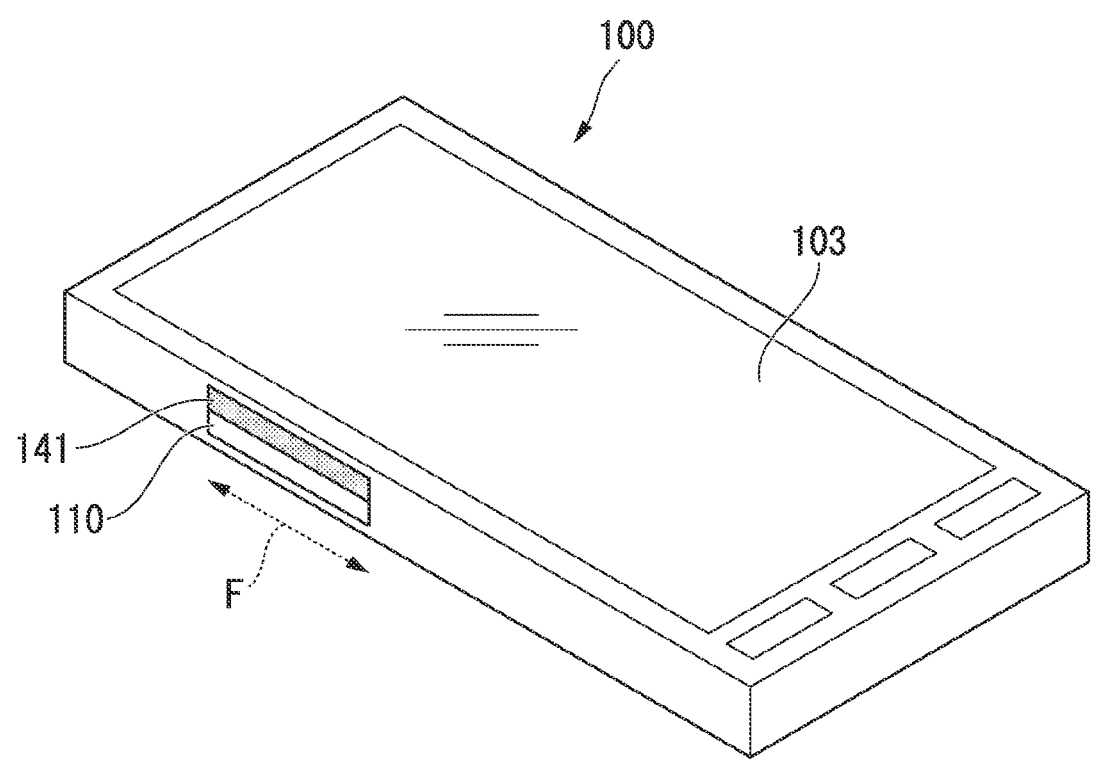
FIG. 22 is a diagram showing an example of arrangement of the touch pad corresponding to the third embodiment.

Additionally, FIG. 22 shows one example of an embodiment of arrangement of the touch pad 110 of the mobile terminal device 100 of the third embodiment. Here, in this figure, the same reference numerals are appended to the same portions as those shown in FIG. 20, and description thereof is omitted.

The touch pad 110 of the mobile terminal device 100 shown in this figure has a rectangular shape, similarly to that shown in FIG. 20, and is provided on the side surface of the housing. Furthermore, a proximity region detecting device 141 is provided so as to be arranged adjacent and parallel to the touch pad 110 along the direction indicated by an arrow F.

By providing the touch pad 110 and the proximity region detecting device 141 in this manner, it is possible to detect a proximity region corresponding to the motion of the finger against the touch pad 110.

Here, FIG. 22 shows an example of the arrangement such that the touch pad 110 and the proximity region detecting device 141 are arranged adjacent to each other along the plane direction, in consideration of the intention to clarify the existence of the proximity region detecting device 141. However, the arrangement may be such that the touch pad 110 and the proximity region detecting device 141 overlap each other.

Here, it is assumed in the above embodiments that the operation input unit 101 of the present embodiment is applied to the mobile terminal device 100. However, the operation input unit 101 is applicable to devices other than the mobile terminal device, such as a remote control.

Additionally, in the above description, the case where the touch pad 110 is manipulated with the thumb is distinguished from the case where the touch pad 110 is manipulated with the index finger. However, in some cases, the touch pad 110 is manipulated with, for example, the middle finger. Thus, even in a case where the touch pad 110 is manipulated with any one of the fingers other than the thumb, such as the middle finger, the ring finger, and the little finger, these fingers are thin so that it will be determined that manipulation has been performed with the index finger. Thus, the pointed coordinate 330 is determined similarly to the case where manipulation is performed with the index finger, thus causing no particular inconvenience.

Additionally, a program for implementing the functions of each unit shown in FIGS. 2, 18, and the like, may be recorded on a computer-readable recording medium, so that a computer system can read and execute the program recorded on the recording medium to determine a pointed coordinate. Here, the "computer system" may include an OS and hardware such as peripheral devices.

Further, the "computer system" may include website hosting platform (or display platform) in a case where a WWW system is used.

Moreover, the "computer-readable recording medium" means a storage device, such as: a portable medium, for example, a flexible disk, a magneto optical disk, a ROM, or a CD-ROM; or a hard disk built in a computer system. Further, the "computer-readable recording medium" may also include a medium that temporarily stores a program, such as a volatile memory included in a computer system which serves as a server or client in a case where the program is transmitted via a network such as the Internet, or a communication line such as a telephone line. Additionally, the above program may be a program for implementing part of the above-described functions. Further, the above program may be a program that can implement the above-described functions in combination with the program already stored in the computer system.

Although the embodiments of the invention have been described above in detail with reference to the drawings, a specific configuration is not limited to those embodiments, the design and the like without departing from the scope of the invention may also be included.

INDUSTRIAL APPLICABILITY

The present invention is applicable to mobile devices, such as smartphones and tablets.

DESCRIPTION OF REFERENCE NUMERALS

100: mobile terminal device
101: operation input unit
102: control unit
103: display unit
104: communication unit
110: touch pad
120: touch pad interface
121: region detecting unit
122: sensitivity setting unit
130: pointed coordinate output unit
131: region combining unit
132: determining unit
133: determination result storing unit
134: pointed coordinate determining unit
140: proximity region detecting unit
141: proximity region detecting device
142: proximity region detecting device interface
142*a*: device supporting proximity region detecting unit

The invention claimed is:

1. An operation input device comprising:
a touch pad that outputs a detection signal indicating a coordinate corresponding to a contact state where a finger is in contact with the touch pad;
a first interface which, based on the detection signal, detects a contact region in which the finger is in contact with the touch pad; and
a second interface which detects a proximity region in which the finger is in proximity to, without contacting, the touch pad; wherein
the proximity region is used to determine whether or not to use a pointed coordinate that is pointed by the finger on the touch pad based on whether or not an area of the contact region detected by the first interface is greater than or equal to a threshold value;

the pointed coordinate is determined based on the contact region detected and the proximity region in a case that the area of the contact region detected is greater than or equal to the threshold value; and the pointed coordinate is determined based on only the contact region detected in a case that the area of the contact region detected is not greater than or equal to the threshold value.

2. The operation input device according to claim 1, wherein
a sensitivity of the touch pad is set so that the touch pad outputs detection signals corresponding to the contact state and the proximity state in the case that it is determined to use the proximity region, and outputs a detection signal corresponding only to the contact state in the case that it is determined not to use the proximity region.

3. The operation input device according to claim 1, wherein a coordinate corresponding to a fingertip in a combined detected region including the contact region detected and the proximity region detected is determined to be the pointed coordinate in the case that it is determined to use the proximity region.

4. The operation input device according to claim 1, wherein a center coordinate of the contact region detected to be the pointed coordinate is determined in the case that it has been determined to not use the proximity region.

5. The operation input device according to claim 1, wherein a threshold value to be compared with the area of the contact region for determination of whether or not to use the proximity region is set based on an area of a thumb which is in contact with the touch pad, and an area of any one of fingers which is in contact with the touch pad, except for a thumb.

6. An operation input method comprising:
detecting a contact region in which a finger is in contact with a touch pad based on a detection signal output from the touch pad;
detecting a proximity region in which the finger is in proximity to, without contacting, the touch pad;
determining whether or not to use the proximity region to determine a pointed coordinate that is pointed by the finger on the touch pad based on whether or not an area of the contact region detected is greater than or equal to a threshold value;
determining the pointed coordinate based on the contact region detected and the proximity region detected in a case that the area of the contact region detected is greater than or equal to the threshold value; and
determining the pointed coordinate based on only the contact region detected in a case that the area of the contact region detected is not greater than or equal to the threshold value; wherein
the detection signal indicates a coordinate corresponding to a contact state where the finger is in contact with the touch pad.

7. A non-transitory computer readable medium including a computer program which causes a computer to execute a method comprising:
detecting a contact region in which a finger is in contact with a touch pad based on a detection signal output from the touch pad;
detecting a proximity region in which the finger is in proximity to, without contacting, the touch pad;
determining whether or not to use the proximity region to determine a pointed coordinate that is pointed by the finger on the touch pad, the determination being performed based on whether or not an area of the contact region detected is greater than or equal to a threshold value;
determining the pointed coordinate based on the contact region detected and the proximity region detected in a case that the area of the contact region detected is greater than or equal to the threshold value; and
determining the pointed coordinate based on only the contact region detected in a case that the area of the contact region detected is not greater than or equal to the threshold value; wherein
the detection signal indicates a coordinate corresponding to a contact state where the finger is in contact with the touch pad, and a second detection signal indicating a coordinate corresponding to a proximity state where the finger is in proximity to, without contacting, the touch pad.

* * * * *